United States Patent
Tomita et al.

(10) Patent No.: US 8,111,339 B2
(45) Date of Patent: Feb. 7, 2012

(54) LIQUID CRYSTAL PROJECTOR AND CONTROL METHOD FOR LIQUID CRYSTAL PROJECTOR

(75) Inventors: Hideo Tomita, Kanagawa (JP); Junichi Iwai, Kanagawa (JP)

(73) Assignee: Sony Corporation, Tokyo (JP)

( * ) Notice: Subject to any disclaimer, the term of this patent is extended or adjusted under 35 U.S.C. 154(b) by 107 days.

(21) Appl. No.: 12/169,275

(22) Filed: Jul. 8, 2008

(65) Prior Publication Data

US 2009/0040402 A1 Feb. 12, 2009

(30) Foreign Application Priority Data

Aug. 7, 2007 (JP) ................... 2007-205081

(51) Int. Cl.
*G02F 1/1335* (2006.01)
(52) U.S. Cl. ................... 349/15; 349/7; 349/13
(58) Field of Classification Search ............... 349/7, 13, 349/15; 359/472, 465
See application file for complete search history.

(56) References Cited

U.S. PATENT DOCUMENTS

| 6,476,820 B1 * | 11/2002 | Harada et al. ............... 345/589 |
| 2005/0168816 A1 * | 8/2005 | Fukaishi et al. ............. 359/465 |
| 2006/0203339 A1 * | 9/2006 | Kleinberger et al. ......... 359/465 |

FOREIGN PATENT DOCUMENTS

| JP | 7-301779 | 11/1995 |
| JP | 8-331602 | 12/1996 |
| JP | 11-298918 | 10/1999 |
| JP | 2005-70722 | 3/2005 |
| JP | 2008-306335 | 12/2008 |

OTHER PUBLICATIONS

U.S. Appl. No. 12/111,432, filed Apr. 29, 2008, Tomita, et al.
Office Action issued Feb. 17, 2011, in Japan Patent Application No. 2007-205081.

* cited by examiner

*Primary Examiner* — Eric Wong
(74) *Attorney, Agent, or Firm* — Oblon, Spivak, McClelland, Maier & Neustadt, L.L.P.

(57) ABSTRACT

A liquid crystal projector which projects a three-dimensional imaged based on image signals for the left and right eyes including: a liquid crystal panel into which an image for the left or right eye is written in a one-field time period based on the image signal; an optical shutter has a plurality of divisional regions arranged in a vertical direction and controllable independently in regard to whether or not light should be blocked; a polarizing element has a plurality of divisional regions arranged in vertical direction and controllable independently in regard to whether the polarization direction should be set to that for the left eye or the right eye; and a control circuit controls the optical shutter and the polarizing element in synchronism with a writing position in the liquid crystal panel.

18 Claims, 15 Drawing Sheets

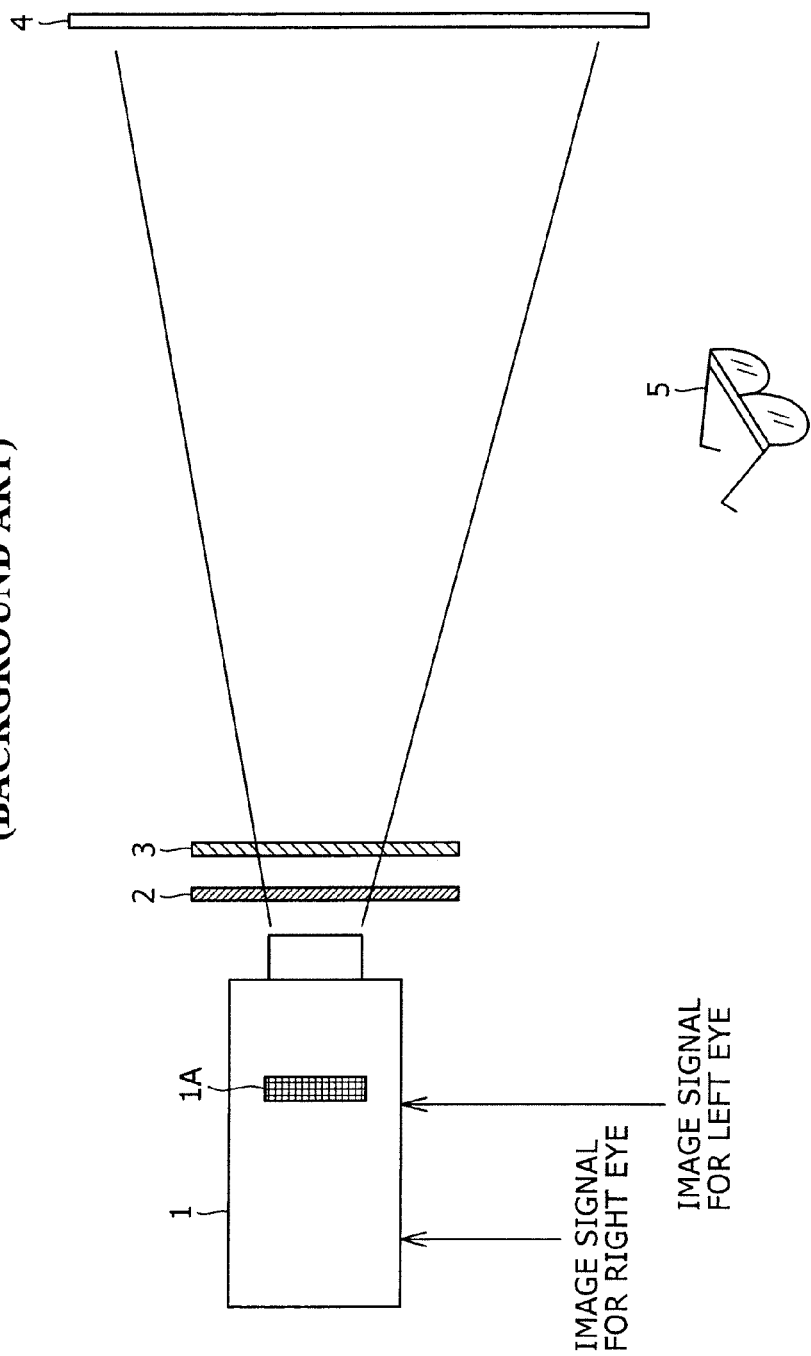

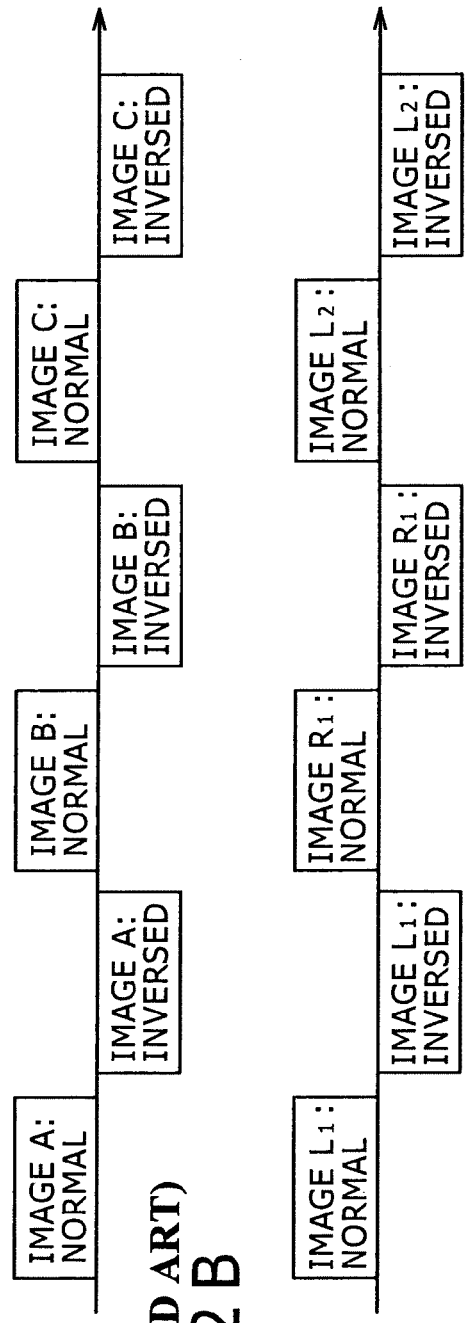
(BACKGROUND ART)
FIG. 2A
(BACKGROUND ART)
FIG. 2B

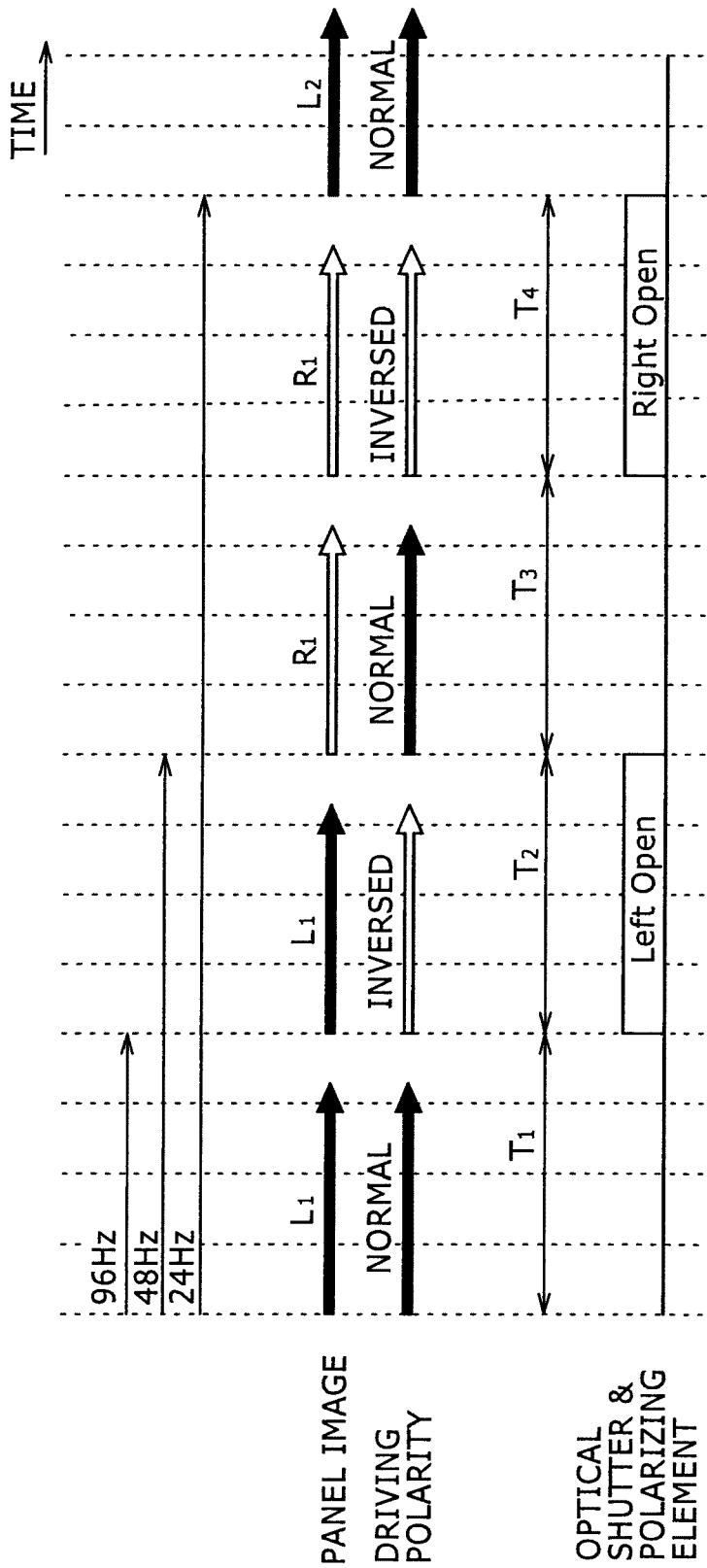
(BACKGROUND ART)
FIG. 3

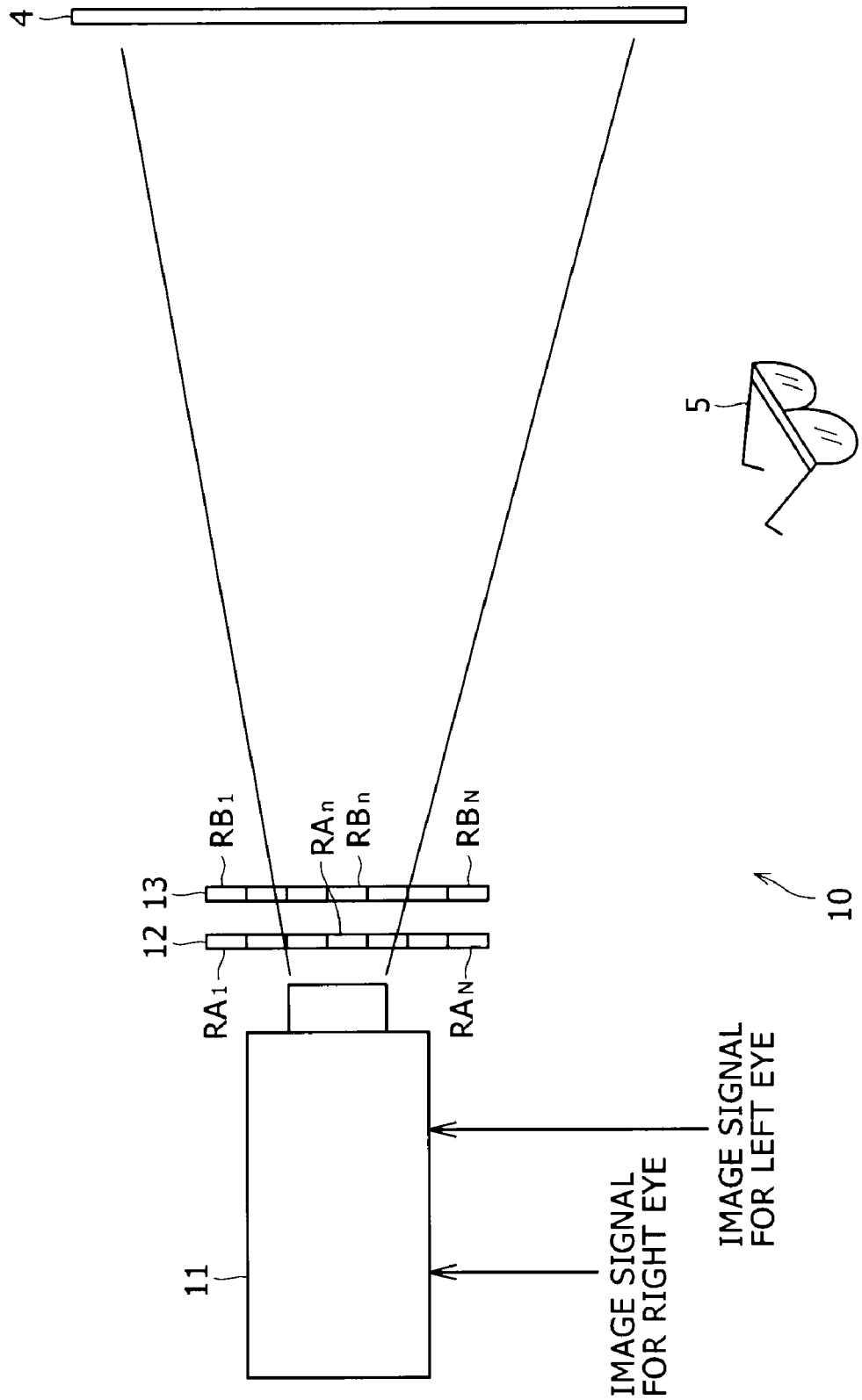

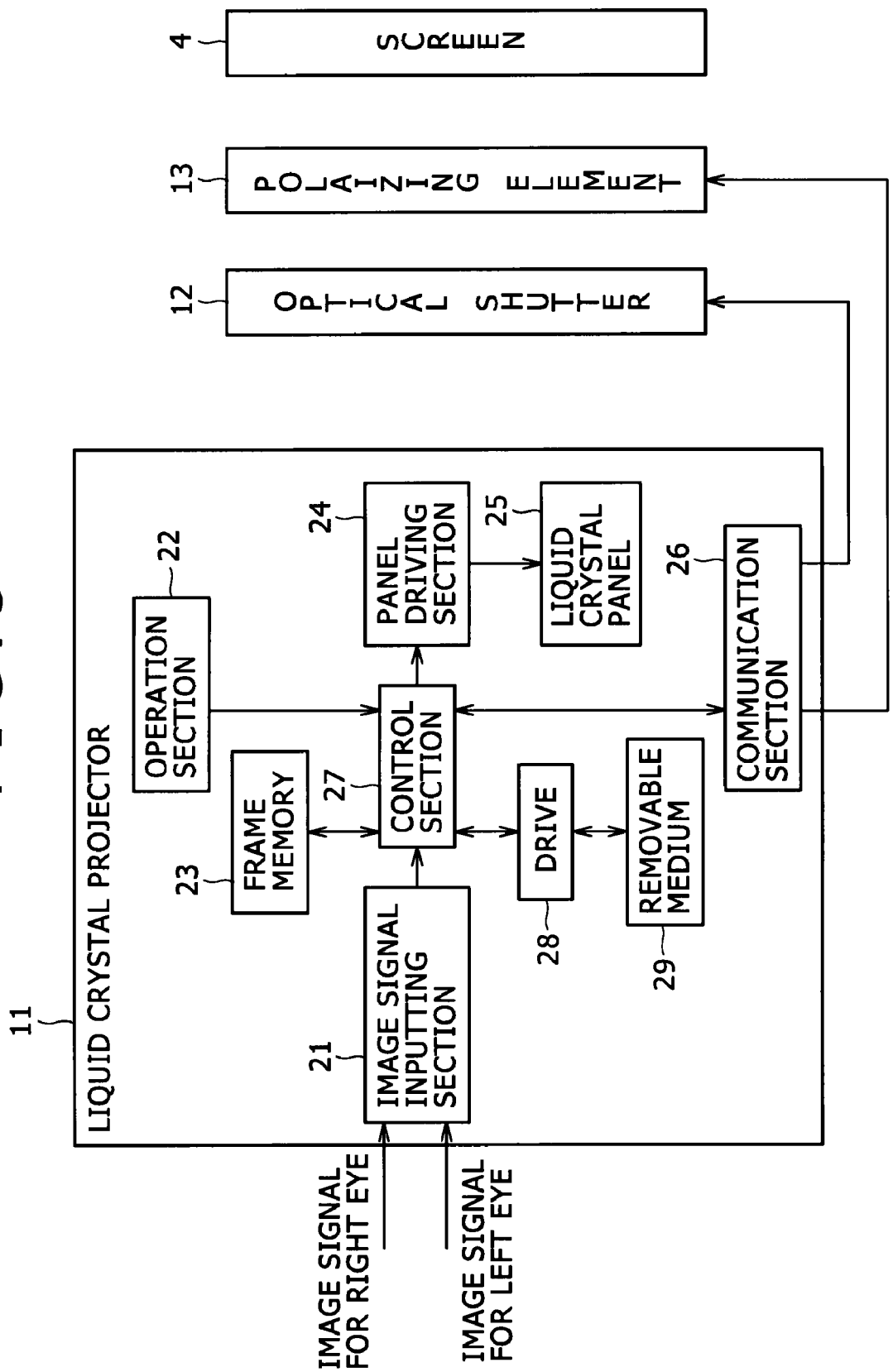

F I G . 6
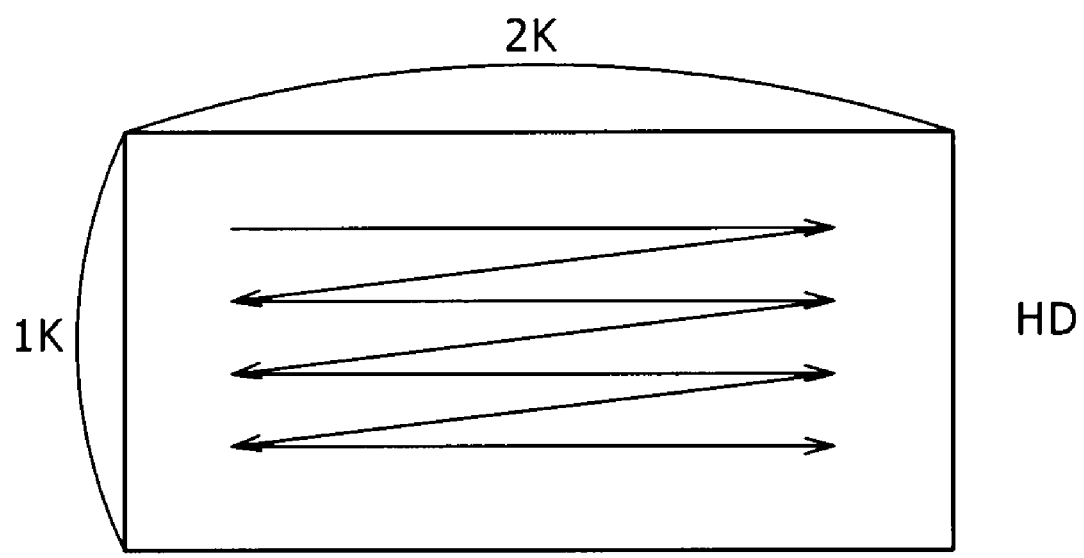

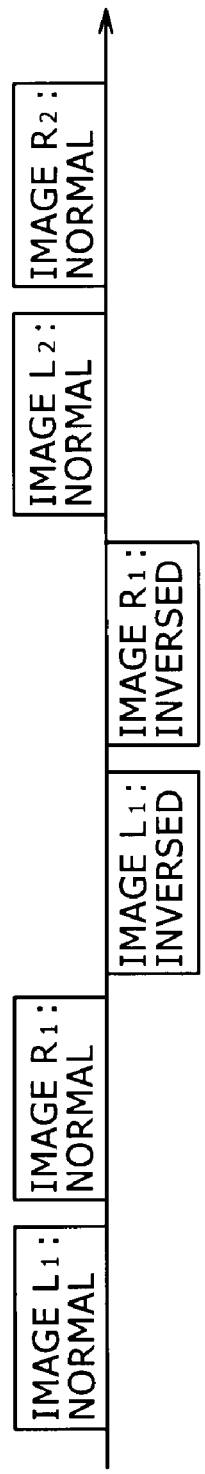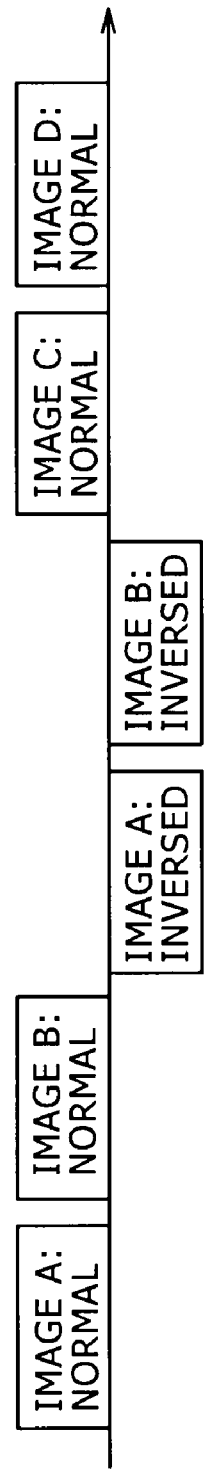
FIG. 7A
FIG. 7B

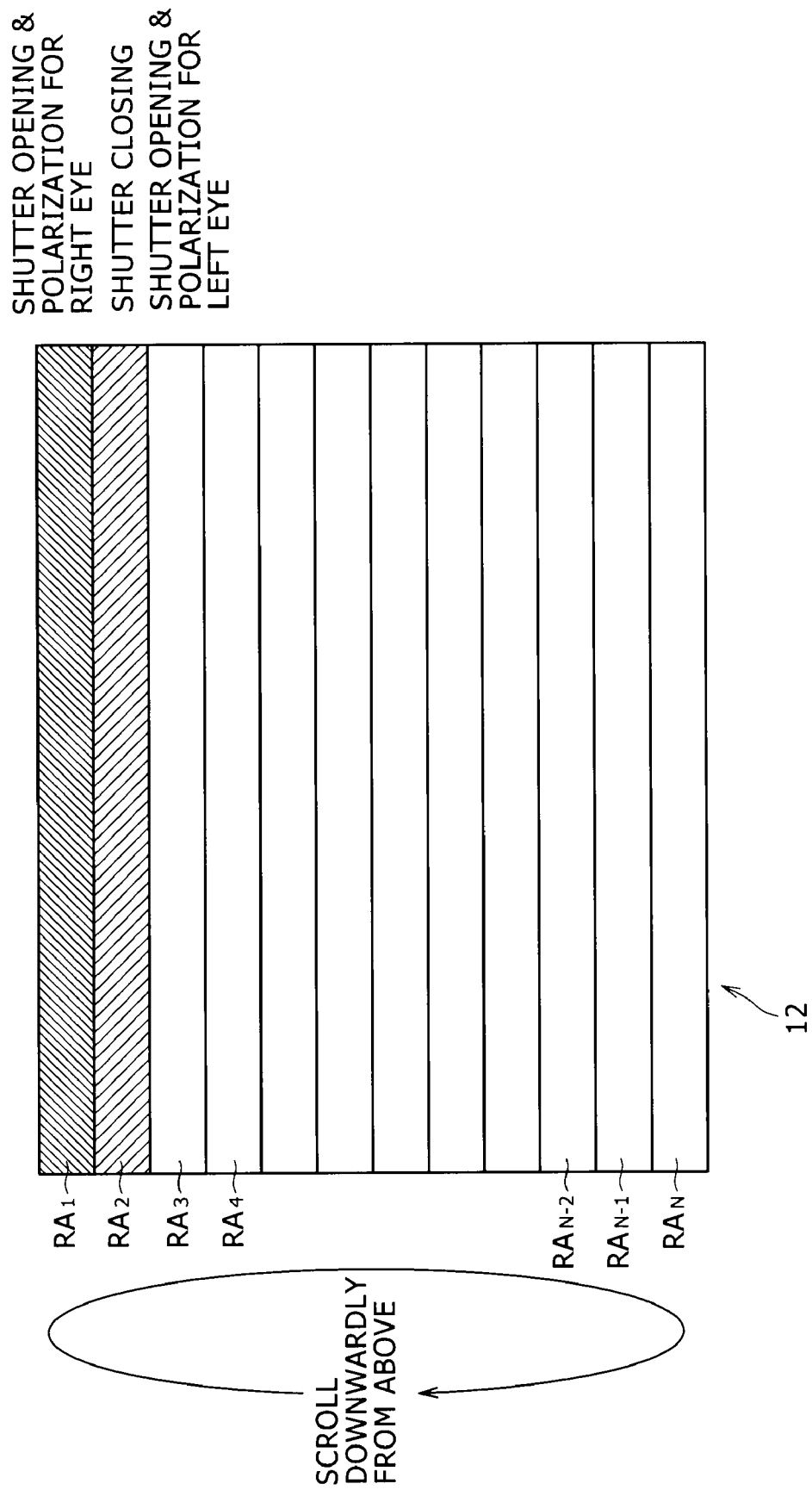

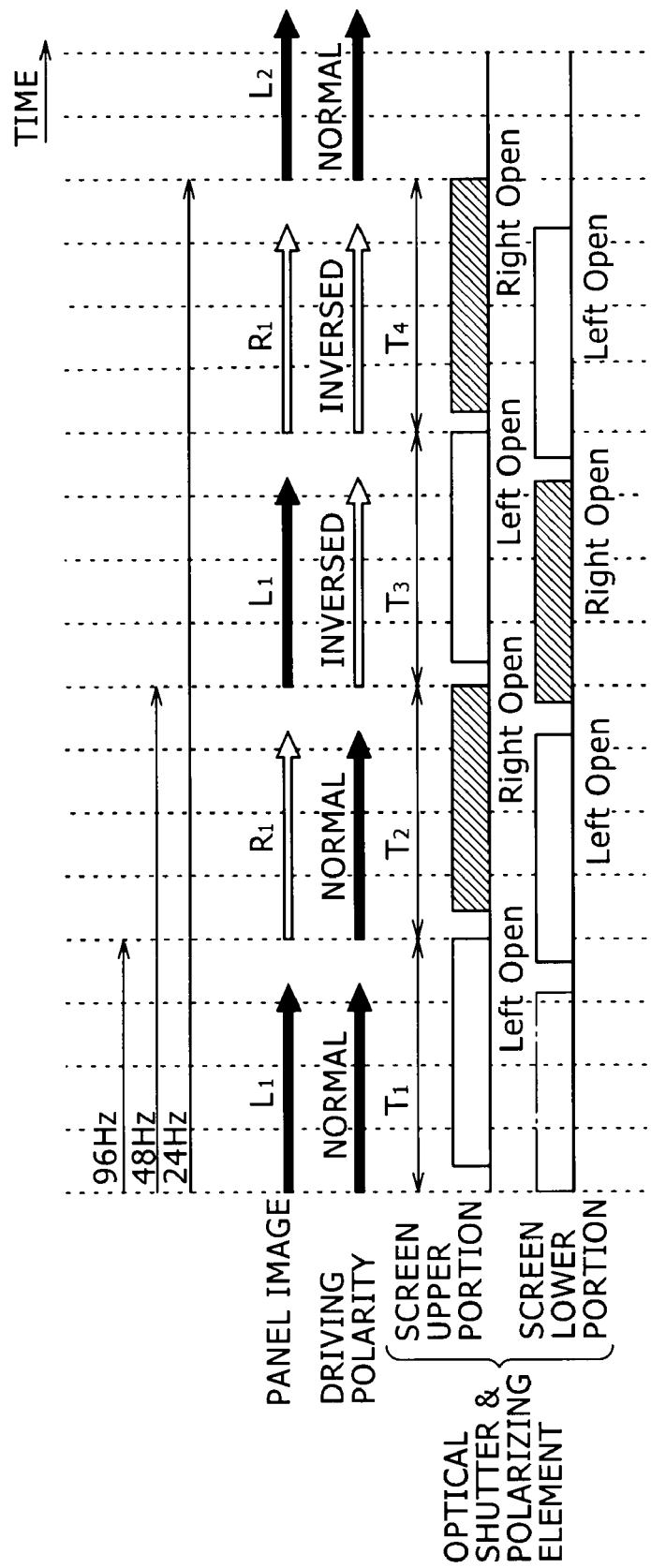

FIG. 10
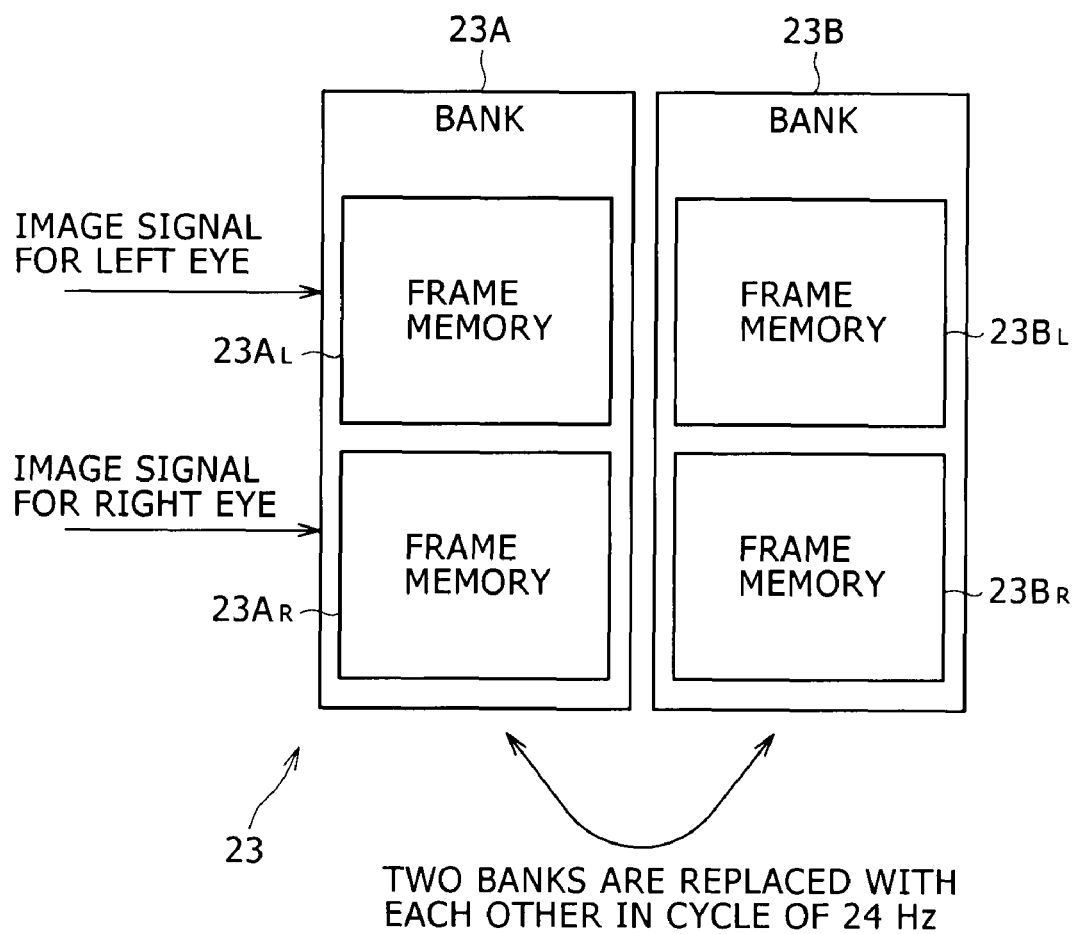

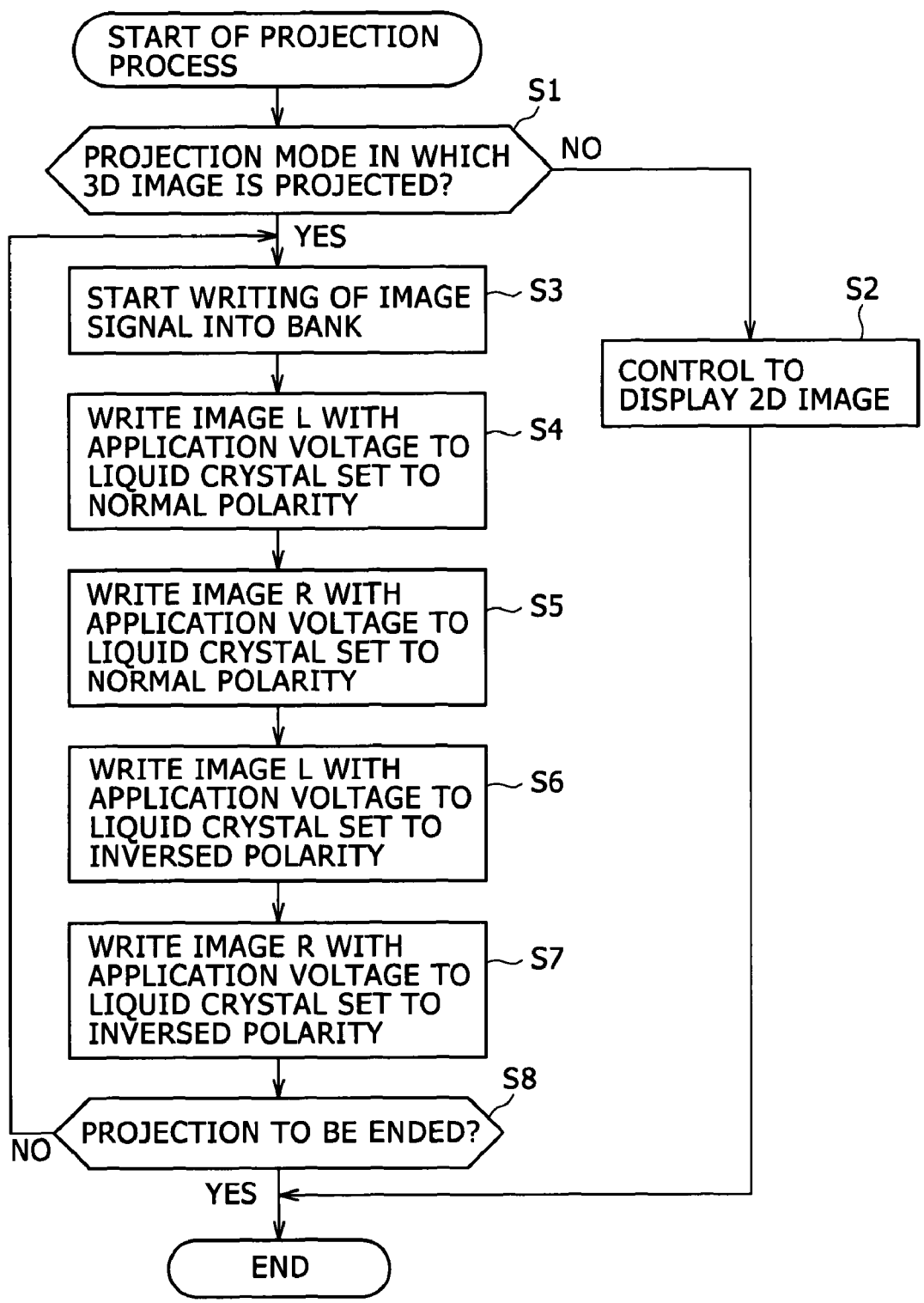
FIG.11

FIG.12
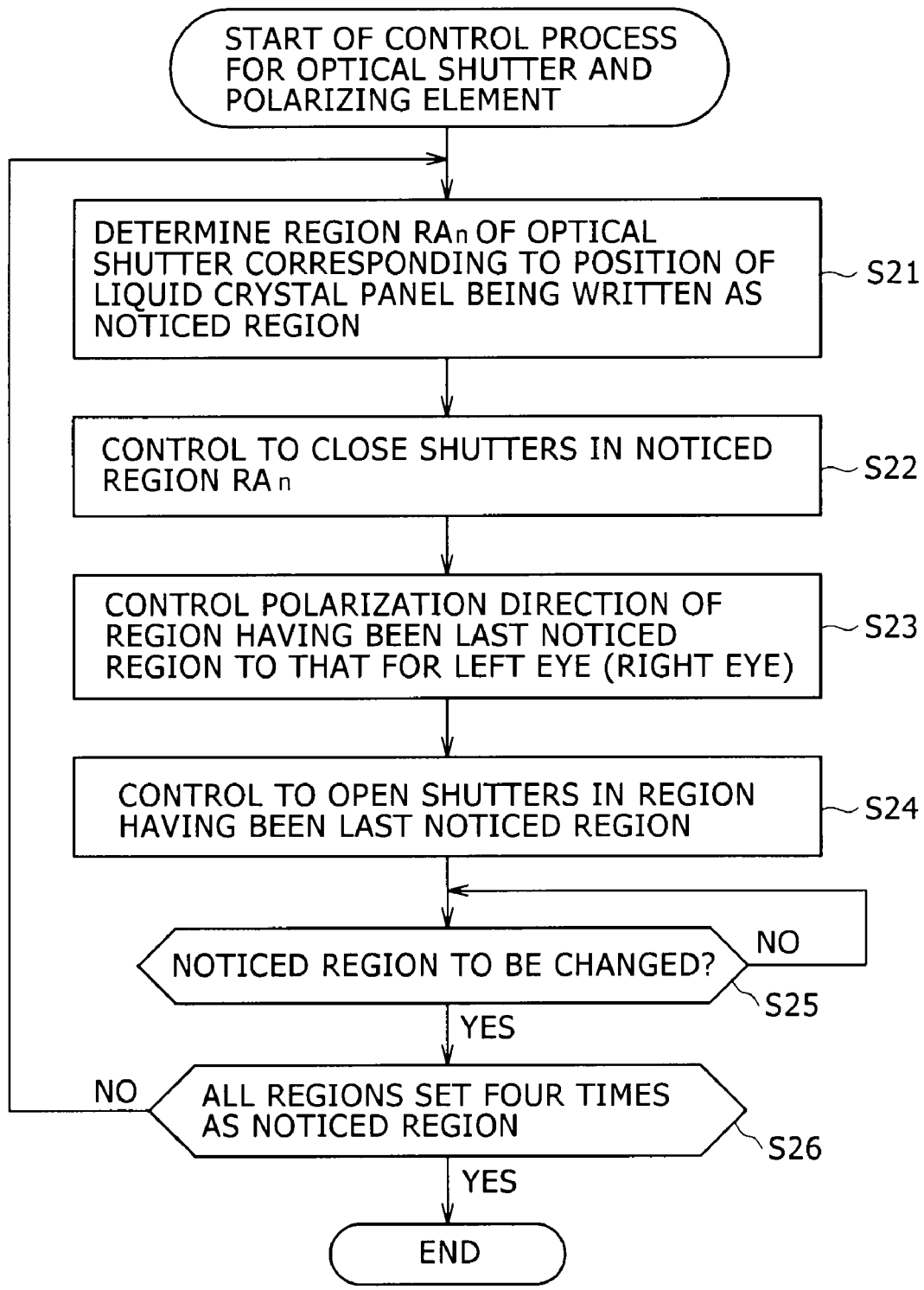

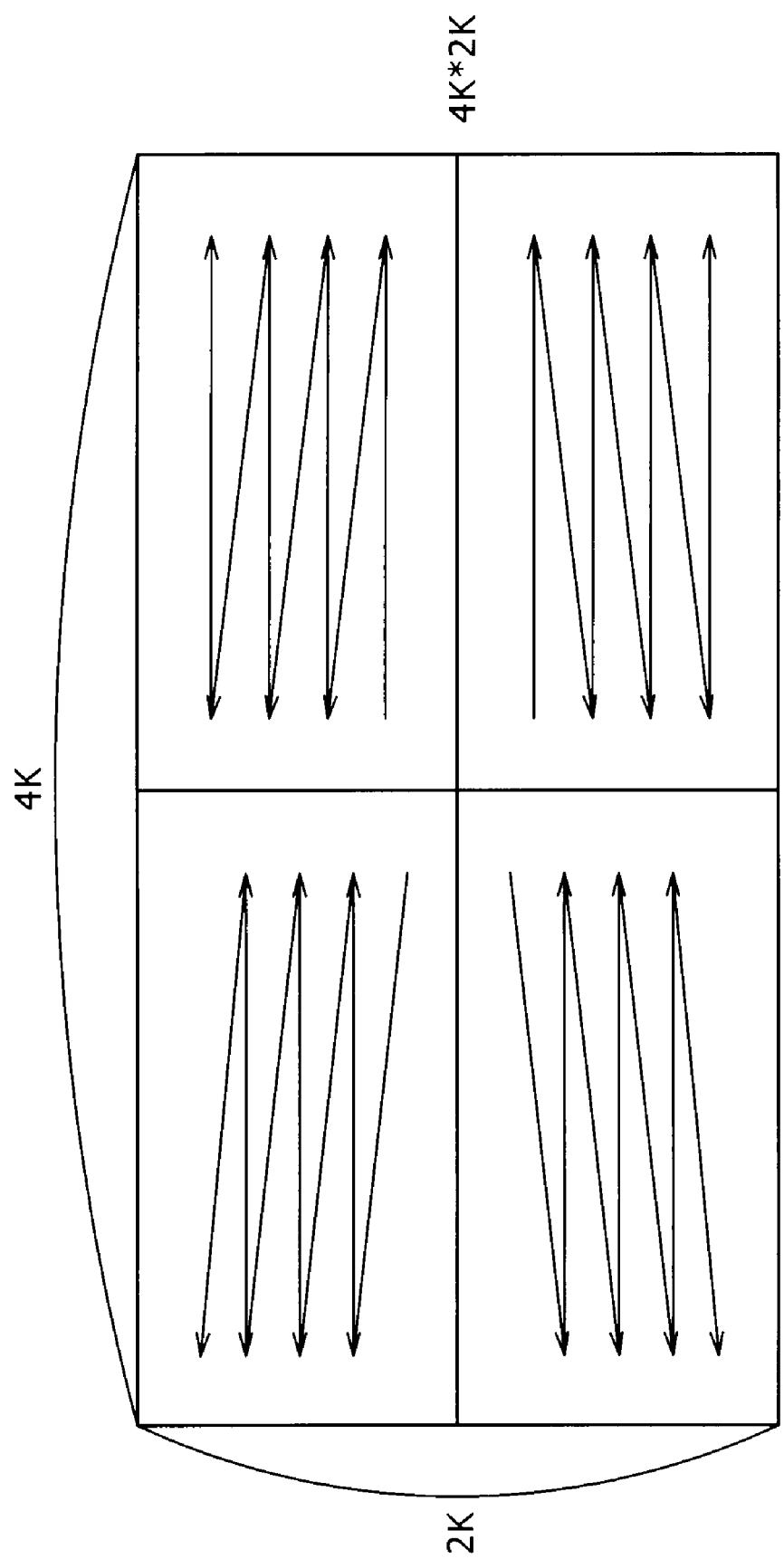
FIG.13

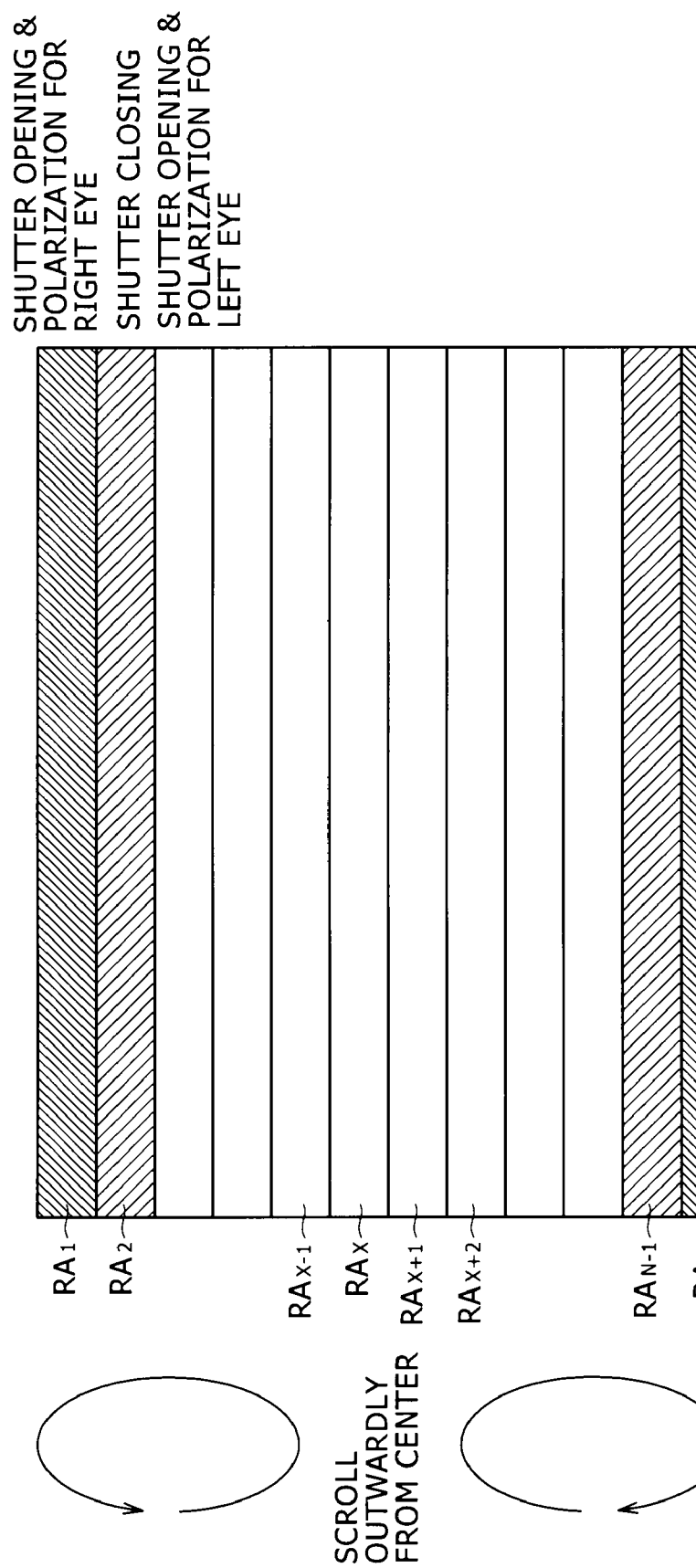

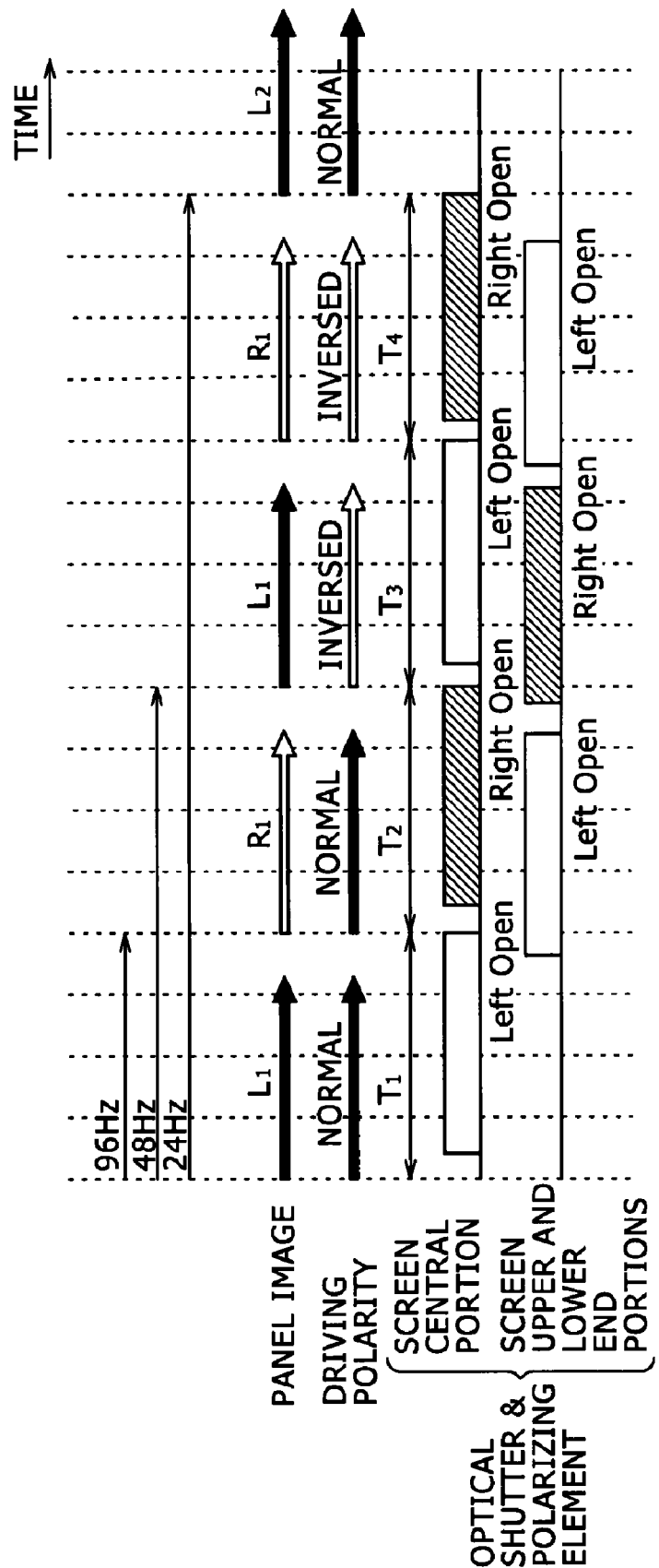

LIQUID CRYSTAL PROJECTOR AND CONTROL METHOD FOR LIQUID CRYSTAL PROJECTOR

CROSS REFERENCES TO RELATED APPLICATIONS

The present invention contains subject matter related to Japanese Patent Application JP 2007-205081 filed in the Japan Patent Office on Aug. 7, 2007, the entire contents of which being incorporated herein by reference.

BACKGROUND OF THE INVENTION

1. Field of the Invention

This invention relates to a liquid crystal projector and a control method for a liquid crystal projector, and more particularly to a liquid crystal projector and a control method for a liquid crystal projector suitable for use to display a three-dimensional image.

2. Description of the Related Art

An image shown on a screen in a movie theater was heretofore taken using a film and shown from the film. Recently, however, as is called digital cinema, an image is recorded in the form of a digital signal and transmitted as an image signal to individual movie theaters, and in each movie theater, the image is shown on a screen using the image signal.

In the theater, the digital image signal transmitted thereto is reproduced, for example, by a liquid crystal projector which uses a liquid crystal device to project an image, and is displayed as an image on the screen.

In recent years, images shown on a screen in a movie theater include 3D contents captured so as to display a three-dimensional stereoscopic image (hereinafter referred to simply as 3D image).

In related art, where it is intended to use a liquid crystal projector to project a 3D image, popularly a technique which uses two liquid crystal projectors is adopted as disclosed, for example, in Japanese Patent Laid-Open No. Hei 8-331602. In this instance, one of the projectors projects an image for the right eye while the other projector projects an image for the left eye.

In recent years, also it has been attempted to use a single liquid crystal projector to project a 3D image.

A method in related art wherein a single liquid crystal projector is used to project a 3D image is described with reference to FIGS. 1 to 3. In other words, in the method described with reference to FIGS. 1 to 3, a 3D image is projected using a method similar to an ordinary method wherein a two-dimensional image (2D image) is projected.

FIG. 1 shows an example of a configuration of a 3D image projection system for projecting a 3D image.

Referring to FIG. 1, in the 3D image projection system, an image signal for the left eye (L side) and an image signal for the right eye (R side) as an image signal of a 3D image for a digital cinema are supplied in a cycle of 24 Hz to a liquid crystal projector 1.

Forwardly of the liquid crystal projector 1 in a direction in which the liquid crystal projector 1 projects an image, an optical shutter 2 and a polarizing element 3 are disposed. The optical shutter 2 blocks or passes light or an image from the liquid crystal projector 1, and the polarizing element 3 polarizes the light incoming thereto to a polarization direction corresponding to the L side or the R side. Usually, a liquid crystal element is used for the optical shutter 2 and the polarizing element 3.

In the liquid crystal projector 1, images corresponding to image signals for the R side and the L side are successively written into a liquid crystal panel 1A, and the images written on the liquid crystal panel 1A are projected by a light source not shown. In particular, light of the images emitted from the liquid crystal projector 1 passes through the optical shutter 2 and is polarized to a predetermined polarization direction by the polarizing element 3 and then displayed on a screen 4.

A user can wear polarizing glasses 5 and watch a 3D image as light of the image for the left eye enters the left eye and light of the image for the right eye enters the right eye.

Incidentally, it is necessary for a liquid crystal device to be driven by AC driving wherein the polarity of the application voltage is inversed with predetermined timings in a unit of one screen image or the like so that the integrated value of DC components may be zero in order to prevent deterioration of the liquid crystal substance and so forth. In the following, one of the polarities of the application voltage is referred to as normal polarity while the other polarity opposite to the normal polarity is referred to as inversed polarity.

For example, where the liquid crystal projector 1 successively displays 2D images A, B and C in a time series, it stacks image signals of the images A, B and C successively supplied thereto in a cycle of 24 Hz into an internal memory and writes the images A, B and C into the liquid crystal panel 1A in such a manner as seen in FIG. 2A to display the images A, B and C. In particular, the image A is first written into the liquid crystal of the liquid crystal panel 1A with the application voltage set to the normal polarity to display the image A, and then the image A is written into the liquid crystal of the liquid crystal panel 1A with the application voltage set to the inversed polarity to display the image A. Then, also when the next image B is to be displayed, the liquid crystal projector 1 first writes the image B into the liquid crystal of the liquid crystal panel 1A with the application voltage set to the normal polarity to display the image B, and then writes the image B into the liquid crystal of the liquid crystal panel 1A with the application voltage set to the inversed voltage to display the image B. This similarly applies also to the image C.

Accordingly, if it is tried to display a 3D image in accordance with the same method as that for the display of a 2D image, then the liquid crystal projector 1 first displays a first image $L_1$ on the L side with the application voltage set to the normal polarity with a certain timing and then displays the first image $L_1$ with the application voltage set to the inversed polarity as seen in FIG. 2B. Then, with a next timing, the liquid crystal projector 1 displays a first image $R_1$ on the R side with the application voltage set to the normal polarity and then displays the image $R_1$ with the application voltage set to the inversed polarity.

The image or panel image written into the liquid crystal panel 1A, the driving polarity representative of whether the polarity of the application voltage then is the normal polarity or the inversed polarity, the opening/closing operation of the optical shutter 2 and the polarization direction of the polarizing element 3 have such a relationship as seen from FIG. 3.

After the image $L_1$ is written within $T_1$ time into the liquid crystal panel 1A with the application voltage set to the normal polarity, the image $L_1$ is written into the liquid crystal panel 1A with the application voltage set to the inversed polarity within $T_2$ time. Further, within the $T_2$ time, the optical shutter 2 is opened and the polarization direction of the polarizing element 3 is controlled to that for the left eye. Since the image written into the liquid crystal panel 1A within the $T_2$ time is same as the image written within the $T_1$ time, there is no problem even if the optical shutter 2 remains open while the image $L_1$ is written into the liquid crystal panel 1A within the $T_2$ time.

Within $T_3$ time next to the $T_2$ time, the image $R_1$ is written into the liquid crystal panel 1A with the application voltage set to the normal polarity and the optical shutter 2 is closed to block the light from the liquid crystal projector 1. This is because, within the $T_3$ time, both of the image $R_1$ written newly and the preceding image $L_1$ exist in the liquid crystal panel 1A. Then, within $T_4$ time, the optical shutter 2 is opened and the polarization direction of the polarizing element 3 is controlled to that for the right eye, and the image $R_1$ is written into the liquid crystal panel 1A with the application voltage set to the inversed polarity.

A period of time within which a series of image $L_1$ (normal), image $L_1$ (inversed), image $R_1$ (normal) and image $R_1$ (inversed) are displayed, that is, the total time period of the $T_1$ time to the $T_4$ time, corresponds to one cycle of 24 Hz.

In this manner, the liquid crystal projector 1 in related art uses image signals for the L side and the R side supplied thereto in a cycle of 24 Hz and projects the images in order of the image L (normal), image L (inversed), image R (normal) and image R (inversed) to the screen 4 to display a 3D image.

SUMMARY OF THE INVENTION

As a result, as can be seen apparently from FIG. 3, it is necessary to keep the optical shutter 2 closed for a period of time equal to one half the period of one cycle of 24 Hz, which is a period within which one image based on a pair of images on the L side and the R side is displayed on the screen 4. Therefore, the liquid crystal projector 1 in related art has a problem in that the image displayed on the screen 4 is dark. Further, since the light source not shown in the liquid crystal projector 1 continues to emit light also while the optical shutter 2 is kept closed, the liquid crystal projector 1 in related art has another problem in that the utilization efficiency of light is low.

Therefore, it is demanded to provide a liquid crystal projector and a driving method therefor wherein a 3D image can be displayed with an enhanced luminance.

According to an embodiment of the present invention, there is provided a liquid crystal projector which projects a three-dimensional image based on an image signal for the left eye and an image signal for the right eye, including a liquid crystal panel into which an image for the left eye or an image for the right eye is written in a one-field time period based on the image signal, an optical shutter having a plurality of divisional regions arranged in a vertical direction and controllable independently of each other in regard to whether or not light should be blocked, a polarizing element having a plurality of divisional regions arranged in the vertical direction and controllable independently of each other in regard to whether the polarization direction should be set to that for the left eye or that for the right eye, and a control circuit configured to control the regions of the optical shutter and the regions of the polarizing element in synchronism with a writing position in the liquid crystal panel.

The liquid crystal projector may be configured such that the liquid crystal panel line-sequentially scans a screen thereof in a direction from the left upper corner toward the right lower corner of the screen so that a predetermined image is written into the liquid crystal panel, and the control circuit controls the regions of the optical shutter and the regions of the polarizing element in the order in which the regions are juxtaposed in the vertical direction.

The liquid crystal projector may be configured such that the liquid crystal panel has a screen having four equal divisional regions and line-sequentially scans the regions in directions from the center of the screen toward the four corners of the screen so that a predetermined image is written concurrently into the regions of the liquid crystal panel, and the control circuit controls the regions of the optical shutter and the regions of the polarizing element in the order in which the regions are juxtaposed in an upward direction and a downward direction from a central portion of the screen.

The liquid crystal projector may be configured such that the liquid crystal panel is applied alternate with application voltages of normal and inversed polarities, and the liquid crystal projector further includes a driving circuit configured to drive, where one and the other of the image signals for the left eye and the right eye are represented as first and second image signals, respectively, and one and the other of the normal and inversed polarity states of the voltage to be applied to the liquid crystal panel are represented as first and second states, respectively, the liquid crystal panel in the order of the first state based on the first image signal, the first state based on the second image signal, the second state based on the first image signal and the second state based on the second image signal.

According to another embodiment of the present invention, there is provided a control method for a liquid crystal projector for projecting a three-dimensional image, the liquid crystal projector including a liquid crystal panel, an optical shutter having a plurality of divisional regions arranged in a vertical direction and controllable independently of each other in regard to whether or not light should be blocked, and a polarizing element having a plurality of divisional regions arranged in the vertical direction and controllable independently of each other in regard to whether the polarization direction should be set to that for the left eye or that for the right eye. The control method includes the steps of writing an image for the left eye or an image for the right eye in a one-field time period into the liquid crystal panel, and controlling whether or not light should be blocked individually in the regions of the optical shutter and whether the polarization direction should be set to that for the left eye or that for the right eye individually in the regions of the polarizing element in synchronism with a writing position in the liquid crystal panel.

In the liquid crystal projector and the control method for a liquid crystal projector, an image for the left eye and an image for the right eye are written line-sequentially into the liquid crystal panel. Then, in synchronism with the writing position in the liquid crystal panel, it is controlled whether or not light should be blocked for the individual regions of the optical shutter and it is controlled whether the polarization direction should be set to that for the left eye or that for the right eye for the individual regions of the polarizing element.

Consequently, with the liquid crystal projector and the control method for a liquid crystal projector, where the single liquid projector is used to display a 3D image, the luminance of the displayed image can be enhanced.

BRIEF DESCRIPTION OF THE DRAWINGS

FIG. 1 is a schematic view showing an example of a 3D image projection system in related art;

FIGS. 2A and 2B are diagrammatic views illustrating driving manners of a liquid crystal panel in related art;

FIG. 3 is a timing chart illustrating a driving manner of a liquid crystal panel in related art;

FIG. 4 is a schematic view showing an example of a configuration of a 3D image projection system to which an embodiment of the present invention is applied;

FIG. 5 is a block diagram showing an example of a configuration of the 3D image projection system of FIG. 4;

FIG. 6 is a schematic view showing an HD panel;

FIGS. 7A and 7B are diagrammatic views illustrating different manners of liquid crystal panel driving where the HD panel is used;

FIG. 8 is a schematic view illustrating control of an optical shutter and a polarizing element used in the 3D image projection system of FIG. 4;

FIG. 9 is a timing chart illustrating a relationship among the panel image, the driving polarity, the opening/closing of the optical shutter and the polarization direction of the polarizing element;

FIG. 10 is a schematic view showing an example of a detailed configuration of a frame memory used in the 3D image projection system of FIG. 4;

FIG. 11 is a flow chart illustrating a projection process of the 3D image projection system of FIG. 4;

FIG. 12 is a flow chart illustrating a control process of the optical shutter and the polarizing element;

FIG. 13 is a schematic view showing a 4K panel;

FIG. 14 is a schematic view illustrating control of the optical shutter and the polarizing element where the 4K panel is used; and FIG. 15 is a timing chart illustrating a relationship among the panel image, the driving polarity, the opening/closing of the optical shutter and the polarization direction of the polarizing element where the 4K panel is used.

DETAILED DESCRIPTION OF THE PREFERRED EMBODIMENTS

Before a preferred embodiment of the present invention is described in detail, a corresponding relationship between several features recited in the accompanying claims and particular elements of the preferred embodiment described below is described. The description, however, is merely for the confirmation that the particular elements which support the invention as recited in the claims are disclosed in the description of the embodiment of the present invention. Accordingly, even if some particular element which is recited in description of the embodiment is not recited as one of the features in the following description, this does not signify that the particular element does not correspond to the feature. On the contrary, even if some particular element is recited as an element corresponding to one of the features, this does not signify that the element does not correspond to any other feature than the element.

According to an embodiment of the present invention, there is provided a liquid crystal projector (for example, a liquid crystal projector 11 of FIG. 5) which projects a three-dimensional image based on an image signal for the left eye and an image signal for the right eye, including a liquid crystal panel (for example, a liquid crystal panel 25 of FIG. 5) into which an image for the left eye or an image for the right eye is written in a one-field time period based on the image signal, an optical shutter (for example, an optical shutter 12 of FIG. 5) having a plurality of divisional regions arranged in a vertical direction and controllable independently of each other in regard to whether or not light should be blocked, a polarizing element (for example, a polarizing element 13 of FIG. 5) having a plurality of divisional regions arranged in the vertical direction and controllable independently of each other in regard to whether the polarization direction should be set to that for the left eye or that for the right eye, and a control circuit (for example, a control section 27 of FIG. 5) configured to control the regions of the optical shutter and the regions of the polarizing element in synchronism with a writing position in the liquid crystal panel.

According to another embodiment of the present invention, there is provided a control method for a liquid crystal projector (for example, a liquid crystal projector 11 of FIG. 5) for projecting a three-dimensional image, the liquid crystal projector including a liquid crystal panel, an optical shutter having a plurality of divisional regions arranged in a vertical direction and controllable independently of each other in regard to whether or not light should be blocked, and a polarizing element having a plurality of divisional regions arranged in the vertical direction and controllable independently of each other in regard to whether the polarization direction should be set to that for the left eye or that for the right eye. The control method includes the steps of writing an image for the left eye or an image for the right eye in a one-field time period into the liquid crystal panel (for example, a step S4 of FIG. 11), and controlling whether or not light should be blocked individually in the regions of the optical shutter and whether the polarization direction should be set to that for the left eye or that for the right eye individually in the regions of the polarizing element in synchronism with a writing position in the liquid crystal panel (for example, steps S23 and S24 of FIG. 12).

In the following, a preferred embodiment of the present invention is described with reference to the accompanying drawings.

FIG. 4 shows an example of a configuration of a 3D image projection system to which the present invention is applied.

Referring to FIG. 4, the 3D image projection system 10 shown includes a liquid crystal projector 11, an optical shutter 12, a polarizing element 13, and a 3D image screen 4. The liquid crystal projector 11 projects a 3D image to a 3D image screen 4.

In particular, in the 3D image projection system 10, light of an image emitted from the liquid crystal projector 11 passes through the optical shutter 12 and is polarized in a predetermined polarization direction by the polarizing element 13 and then projected to the 3D image screen 4 similarly as in the 3D image projection system described hereinabove with reference to FIG. 1. Where light of an image for the left eye is emitted from the liquid crystal projector 11, the polarizing element 13 polarizes the light to the polarization direction for the left eye. However, where light of an image for the right eye is emitted from the liquid crystal projector 11, the polarizing element 13 polarizes the light to the polarization direction for the right eye. The polarization direction for the right eye and the polarization direction for the left eye are, for example, perpendicular to each other.

When a user wears polarized glasses 5 and the light of the image for the left eye enters the left eye while the light of the image for the right eye enters the right eye, the user can watch the images shown on the 3D image screen 4 as a 3D image.

The optical shutter 12 is divided into N regions $RA_1$ to $RA_N$ such that a region thereof through which the light of the image emitted from the liquid crystal projector 11 is equally divided into N portions in a vertical direction as seen in FIG. 4. The optical shutter 12 is different from the optical shutter 2 shown in FIG. 1 in that opening and closing shutter movements, that is, turning on and off of light blocking, can be controlled individually for and independently of the regions $RA_1$ to $RA_N$.

Also the polarizing element 13 is divided into N regions $RB_1$ to $RB_N$ such that a region thereof through which the light of the image emitted from the liquid crystal projector 11 is equally divided into N portions in a vertical direction as seen in FIG. 4. The polarizing element 13 is different from the polarizing element 3 shown in FIG. 1 in that the polarization direction can be controlled individually for and independently of the regions $RB_1$ to $RB_N$.

Accordingly, the regions $RA_1$ to $RA_N$ and the regions $RB_1$ to $RB_N$ have a horizontally elongated rectangular shape.

FIG. 4 schematically shows the 3D image projection system 10 in such a manner as to facilitate understandings of the configuration of the same, but the 3D image projection system 10 has actual arrangement different from that shown in FIG. 4. For example, while the region $RA_1$ of the optical shutter 12, the region $RB_1$ of the polarizing element 13 and so forth are shown positioned outside the region through which light of an image emitted from the liquid crystal projector 11 in FIG. 4 passes, actually they exist within the region within which light of an image emitted from the liquid crystal projector 11 passes. Further, the positions at which the optical shutter 12 and the polarizing element 13 are disposed, or more particularly the ratio of the distance from the liquid crystal projector 11 to the optical shutter 12 or the polarizing element 13 to the distance from the liquid crystal projector 11 to the 3D image screen 4, is different from that in FIG. 4.

Although the liquid crystal projector 11 can naturally display also a 2D image, in the following description, display of a 3D image by the liquid crystal projector 11 is described principally, but display of a 2D image is described supplementarily as occasion demands.

FIG. 5 shows an example of a configuration of the 3D image projection system 10.

Referring to FIG. 5, the liquid crystal projector 11 includes an image signal inputting section 21, an operation section 22, a frame memory 23, a panel driving section 24, a liquid crystal panel 25, a communication section 26, a control section 27, and a drive 28. The drive 28 allows a removable medium 29 to be loaded therein as occasion demands. The removable medium 29 is a package medium which includes, for example, a magnetic disk including a flexible disk, an optical disk including a CD-ROM (Compact Disc-Read Only Memory) and a DVD (Digital Versatile Disc), a magneto-optical disk, and a semiconductor memory.

The image signal inputting section 21 receives an image signal for the left eye and another image signal for the right eye inputted thereto simultaneously in a cycle of 24 Hz. The image signal inputting section 21 supplies the image signals for the left and right eyes inputted thereto to the control section 27. It is to be noted that, in the following description, where images for the left eye and the right eye or images inputted in a time series are to be distinguished from each other, they are represented as images $L_1$, $L_2$, $L_3$, . . . and images $R_1$, $R_2$, $R_3$, . . . similarly as in the case of FIGS. 2 and 3. Further, image signals corresponding to images represented by subscripts of the same number are those inputted simultaneously to the image signal inputting section 21.

The operation section 22 includes operation buttons, a display section and so forth not shown and accepts a predetermined operation from an operator. An operation signal corresponding to the operation of the operator is supplied from the operation section 22 to the control section 27. For example, the operator can operate the operation section 22 to set a projection mode representing whether a 2D image should be projected or a 3D image should be projected. An operation signal representing the thus set projection mode is supplied from the operation section 22 to the control section 27.

The frame memory 23 temporarily stores an image signal supplied from the image signal inputting section 21, or in other words, stores an image to be written into the liquid crystal panel 25. The frame memory 23 has a two-bank configuration as hereinafter described with reference to FIG. 10, and writing or reading out of an image signal is carried out alternately for the two banks 23A and 23B (FIG. 10).

The panel driving section 24 is formed, for example, from a driving circuit and drives the liquid crystal panel 25 based on a driving control signal from the control section 27. The panel driving section 24 does not inverse or inverses the application voltage to liquid crystal to write a predetermined image corresponding to the image signal into the liquid crystal panel 25. However, in order to prevent deterioration of the liquid crystal substance and so forth as described hereinabove, the panel driving section 24 drives the liquid crystal panel 25 so that the integrated value of DC components may be zero, that is, drives the liquid crystal panel 25 by AC driving.

The liquid crystal panel 25 has a predetermined number of pixels or a resolution as a screen thereof. The pixels are scanned line-sequentially by the panel driving section 24 to rewrite an image of the liquid crystal panel 25 for one screen in a one-field period. In the present embodiment, the liquid crystal panel 25 is an HD panel having a resolution of 2K×1K (horizontal direction×vertical direction) as seen from FIG. 6 and is scanned line-sequentially in a direction from the left upper corner to the right lower corner of the screen by the panel driving section 24. Light corresponding to the image written in the liquid crystal panel 25 is emitted from the liquid crystal projector 11 by a light source not shown and is projected to the 3D image screen 4.

Referring back to FIG. 5, the communication section 26 supplies a control signal supplied thereto from the control section 27 to the optical shutter 12 or the polarizing element 13. The control signal supplied to the optical shutter 12 is for controlling opening or closing of the optical shutter 12, and the control signal supplied to the polarizing element 13 is for controlling the polarization direction of the polarizing element 13.

The control section 27 is formed, for example, from a CPU (Central Processing Unit) or a control circuit and controls the components of the liquid crystal projector 11. For example, the control section 27 writes an image signal supplied thereto from the image signal inputting section 21 into the frame memory 23 and then reads out the control signal from the frame memory 23 and supplies a driving control signal corresponding to the read out image signal to the panel driving section 24. Further, the control section 27 supplies control signals to the optical shutter 12 and the polarizing element 13 through the communication section 26 in response to the image written in the liquid crystal panel 25 to control opening or closing of the optical shutter 12 for the individual regions $RA_1$ to $RA_N$ and control the polarization direction of the polarizing element 13 for the individual regions $RB_1$ to $RB_N$.

The drive 28 drives the removable medium 29 to read out an image signal recorded on the removable medium 29 and supplies the image signal to the control section 27 or writes an image signal supplied thereto from the control section 27 into the removable medium 29.

Operation control of the liquid crystal projector 11 configured in such a manner as described above when it projects a 3D image is described with reference to FIGS. 7 to 9.

Image signals are inputted in the order of images $L_1$ and $R_1$, images $L_2$ and $R_2$, images $L_3$ and $R_3$, . . . into the image signal inputting section 21 and successively stored into the frame memory 23. The control section 27 reads out an image signal from the frame memory 23 and supplies a driving control signal corresponding to the read out image signal to the panel driving section 24. The panel driving section 24 drives the liquid crystal panel 25 in such a manner as seen in FIG. 7A based on the driving control signal from the control section 27. In particular, the panel driving section 24 first sets the application voltage to the liquid crystal of the liquid crystal panel 25 to the normal polarity to write the image $L_1$ into the liquid crystal panel 25. Then, the panel driving section 24 sets the application voltage similarly to the normal polarity to write the image $R_1$ into the liquid crystal panel 25. Thereafter, the panel driving section 24 sets the application voltage to the inversed polarity to write the image $L_1$ into the liquid crystal panel 25. Further, the panel driving section 24 sets the application voltage similarly to the inversed polarity to write the image $R_1$ into the liquid crystal panel 25.

Also thereafter, similar processes are repeated. In particular, the images $L_2$ and $R_2$ are written in the order of the image $L_2$ (normal), image $R_2$ (normal), image $L_2$ (inversed), image $R_2$ (inversed) into the liquid crystal panel 25.

The driving control illustrated in FIG. 7A corresponds to successive display of 2D images A, B and C illustrated in FIG. 7B. Referring to FIG. 7B, images are successively written in the order of the image A (normal), image B (normal), image A (inversed) and image B (inversed). In particular, the images A and B are successively written in order into the liquid crystal panel 25 with the application voltages therefor set to the normal polarity first, and then the images A and B are successively written in order into the liquid crystal panel 25 with the application voltages therefor set to the inversed polarity. Thereafter, the images C and D are written into the liquid crystal panel 25 with the application voltages therefor set to the normal polarity, and the images C and D are written into the liquid crystal panel 25 with the application voltage therefor set to the inversed polarity.

In other words, where the method when a 3D image is projected using the liquid crystal projector 11 is compared with the method in related art described hereinabove with reference to FIG. 2A, it is considered that the liquid crystal projector 11 carries out driving control wherein the image A (inversed) and the image B (normal) are replaced in the direction of the time axis.

FIG. 8 illustrates control of the optical shutter 12 and the polarizing element 13 corresponding to the writing of images into the liquid crystal panel 25 described above with reference to FIG. 7A.

The optical shutter 12 has N rectangular regions $RA_1$ to $RA_N$ as described hereinabove, and the regions $RA_1$ to $RA_N$ thereof are controlled individually and independently of each other by the control section 27 through the communication section 26. The regions $RB_1$ to $RB_N$ of the polarizing element 13 correspond to the regions $RA_1$ to $RA_N$ of the optical shutter 12, respectively.

As described hereinabove with reference to FIG. 6, the liquid crystal panel 25 is scanned line-sequentially in a direction from the left upper corner to the right lower corner of the screen. In particular, where the line-sequential scanning is considered in regard to the regions $RA_1$ to $RA_N$ of the optical shutter 12, the liquid crystal panel 25 updates images in the order of regions $RA_1$, $RA_2$, $RA_3$, ..., $RA_{N-1}$, $RA_N$, $RA_1$, $RA_2$, $RA_3$, ... beginning with the region $RA_1$ at the top of the screen.

Therefore, the control section 27 of the liquid crystal projector 11 controls the optical shutter 12 and the polarizing element 13 so as to scroll the regions $RA_1$ to $RA_N$ from the top to the bottom. More particularly, the control section 27 determines a region $RA_n$ (n=one of 1, ..., N) corresponding to those pixels of the liquid crystal panel 25 into which an image is to be written (to be updated) from among the regions $RA_1$ to $RA_N$ of the optical shutter 12 as a noticed region, and controls the shutters in the noticed region so as to be closed. Then, when the line-sequential scanning of the liquid crystal panel 25 advances until writing into the noticed region ends, the control section 27 sets a region next to the noticed region, that is, the next or underlying region $RA_{n+1}$ as a new noticed region. Further, the control section 27 opens the shutters in the region $RA_n$ which has been set as the noticed region and controls the region $RB_n$ of the polarizing element 13 so that the polarization direction of the polarizing element 13 may be set to that for the right eye.

It is to be noted that the next noticed region where the noticed region of the optical shutter 12 is the bottom region $RA_N$ is the top region $RA_1$, and also the next noticed region where the noticed region of the polarizing element 13 is the bottom region $RB_N$ is the top region $RB_1$ similarly. Further, since the polarization direction of the polarizing element 13 is changed over between that for the right eye and that for the left eye for every scanning of one screen as described hereinabove with reference to FIG. 7A, the region $RB_n$ is controlled so that, after the polarization direction for the right eye is used, the polarization direction for the left eye is established, but after the polarization direction for the left eye is used, the polarization direction for the right eye is established.

In FIG. 8, it is illustrated that the region $RA_2$ indicated by a shadow is set as a noticed region, in which the shutters are closed. Meanwhile, the region $RA_1$ indicated by slanting lines has formerly been a noticed region, and in the region $RA_1$, the shutters are open and the polarization direction is controlled to that for the right eye. On the other hand, in the regions $RA_3$ to $RA_N$ which are not set to a noticed region, the shutters are open and the polarization direction is controlled to that for the left eye.

FIG. 9 is a view corresponding to the view of the driving control in related art illustrated in FIG. 3 and illustrates a relationship among the panel image and driving polarity of the liquid crystal projector 11, opening/closing operation of the optical shutter 12 and polarization direction of the polarizing element 13.

Referring to FIG. 9, within a time $T_1$, the image $L_1$ is written into the liquid crystal panel 25 by an application voltage of the normal polarity. In this instance, in the region $RA_1$ of the optical shutter 12 and the region $RB_1$ of the polarizing element 13 which correspond to the top of the screen of the liquid crystal panel 25, the shutters are opened and the polarization direction is controlled to that for the left eye from an initial stage of the $T_1$ time at which writing into a region of the liquid crystal panel 25 corresponding to the regions $RA_1$ and $RB_1$ is completed.

The time at which the shutters of the region $RA_1$ of the optical shutter 12 are closed for the next time is the top of $T_2$ time after time of approximately one field at which the region $RA_1$ is set to a noticed region subsequently. Then, within the $T_2$ time, when the shutters in the region $RA_1$ of the optical shutter 12 are opened again, the polarization direction in the region $RB_1$ of the polarizing element 13 is controlled to that for the right eye. The shutter opening in the region $RA_1$ and the polarization control for the right eye are maintained for a period of time of one field.

On the other hand, in the region $RA_N$ of the optical shutter 12 and the region $RB_N$ of the polarizing element 13 which correspond to the bottom of the screen of the liquid crystal panel 25, the shutters are opened and the polarization direction is controlled to that for the left eye immediately before the end of the $T_1$ time at which writing into a region of the liquid crystal panel 25 corresponding to the regions $RA_N$ to $RB_N$ ends.

The time at which the shutters in the region $RA_N$ of the optical shutter 12 are closed for the next time is a point of time immediately before the end of the $T_2$ time after a period of time of one field at which the region $RA_N$ is set to a noticed region subsequently. Then, when the shutters in the region $RA_N$ of the optical shutter 12 are opened again within the $T_2$ time, the polarization direction in the region $RB_N$ of the polarizing element 13 is controlled to that for the right eye. The shutter opening in the region $RA_N$ and the polarization control for the right eye are maintained for a period of time of approximately one field.

Also control of the shutters and the polarization direction within $T_3$ time and $T_4$ time is carried out similarly.

If the period of time within which the optical shutter 2 is open within a period of one cycle of 24 Hz is compared with that of the 3D image projection system described hereinabove with reference to FIG. 1, that is, if FIGS. 3 and 9 are compared with each other, then it can be recognized that the period of time within which it is necessary to close the shutters in the 3D image projection system 10 can be made a very short period of time within which each of the regions of the optical shutter 12 is set as a noticed region. Accordingly, with the 3D image projection system 10, the luminance of the projected image can be enhanced significantly when compared with that of the system in related art.

Further, the 3D image display method by the 3D image projection system of FIG. 1 has a problem also in that, since one image including an L side image and an R side image in pair can be displayed only in a cycle of 24 Hz, the image suffers from flickers to such a degree that it is not worth watching.

In the 3D image projection system 10, an image for the right eye and an image for the left eye are individually displayed twice in the order of the image $L_1$ (normal), image $R_1$ (normal), image $L_1$ (inversed) and image $R_1$ (inversed) within a period of one cycle of 24 Hz as can seen clearly from FIG. 9. Therefore, a 3D image can be displayed in a cycle of 48 Hz which is twice the cycle of 24 Hz, and consequently, flickers can be reduced significantly. In this instance, also the condition necessary for a liquid crystal device that the integrated value of DC components is zero is satisfied.

Now, reading out of an image L (normal), an image R (normal), the image L (inversed) and the image R (inversed) from the frame memory 23 is described with reference to FIG. 10. FIG. 10 illustrates an example of a detailed configuration of the frame memory 23.

The frame memory 23 includes two banks 23A and 23B, each of which has two frame memories for storing image signals for the left eye and the right eye. In particular, the bank 23A has frame memories $23A_L$ and $23A_R$, and the bank 23B has frame memories $23B_L$ and $23B_R$.

In the banks 23A and 23B, reading out and writing of an image signal are carried out alternately in a cycle of 24 Hz.

For example, within a certain period of one cycle of 24 Hz, an image signal of the image $L_2$ and an image signal of the image $R_2$ supplied from the control section 27 are written into the frame memories $23A_L$ and $23A_R$ of the bank 23A, respectively. Simultaneously, an image signal of the image $L_1$ and an image signal of the image $R_1$ stored in the frame memories $23B_L$ and $23B_R$ of the bank 23B, respectively, are read out.

Here, since, in the reading of an image signal of the bank 23B, it is necessary for the image $L_1$ and the image $R_1$ to be individually read out twice in the order of the image $L_1$, image $R_1$, image $L_1$ and image $R_1$ within a period of one cycle of 24 Hz, the reading out speed is four times the writing speed.

Within the next period of one cycle, an image signal of the image $L_3$ and an image of the image $R_3$ supplied from the control section 27 are written into the frame memories $23B_L$ and $23B_R$ of the bank 23B, respectively. Simultaneously, the image signal of the image $L_2$ and the image signal of the image $R_2$ stored in the frame memories $23A_L$ and $23A_R$ of the bank 23A are read out in order from the frame memories $23A_L$ and $23A_R$, $23A_L$ and $23A_R$ at a speed equal to four times that for writing.

It is to be noted that, where the liquid crystal projector 11 projects a 2D image, only one frame memory of each of the banks 23A and 23B, for example, the frame memories $23A_L$ and $23B_L$, may be used to carry out reading out and writing of an image alternately to display a 2D image.

Now, a projection process by the 3D image projection system 10 is described with reference to the flow chart of FIG. 11. The projection process is started, for example, when a projection start button of the operation section 22 is operated.

First at step S1, the control section 27 decides whether or not the projection mode currently set is a projection mode for projecting a 3D image. If it is decided at step S1 that the currently set projection mode is not the projection mode for projecting a 3D image, that is, where the currently set projection mode is a projection mode for projecting a 2D image, then the processing advances to step S2. At step S2, the control section 27 carries out control for displaying a 2D image on the screen 4. In this instance, the panel driving section 24 carries out the driving control for displaying a 2D image described hereinabove with reference to FIG. 2A, and the control section 27 controls the optical shutter 12 and the polarizing element 13 in such a manner as described above with reference to FIG. 3. Then, when inputting of an image signal of an image to be projected to the image signal inputting section 21 comes to an end, the projection process ends.

On the other hand, if it is decided at step S1 that the currently set projection mode is the projection mode for projecting a 3D image, then the processing advances to step S3. At step S3, the control section 27 starts writing of an image signal for the right eye and an image signal for the left eye supplied thereto from the image signal inputting section 21 into the band 23A of the frame memory 23. The writing into the band 23A started at step S3 is executed concurrently until processes at steps S4 to S7 described below come to an end.

At step S4, the control section 27 reads out an image L from the frame memory $23B_L$ of the bank 23B and supplies a driving control signal corresponding to the read out image L to the panel driving section 24. Consequently, the panel driving section 24 writes the image L into the liquid crystal panel 25 with the application voltage to the liquid crystal set to the normal polarity.

After the writing of the image L ends, the control section 27 reads out, at step S5, an image R from the frame memory $23B_R$ of the bank 23B and supplies a driving control signal corresponding to the read out image R to the panel driving section 24. Consequently, the panel driving section 24 writes the image R into the liquid crystal panel 25 with the application voltage to the liquid crystal set to the normal polarity.

After the writing of the image R ends, the control section 27 reads out, at step S6, the image signal L from the frame memory $23B_L$ of the bank 23B and supplies a driving control signal corresponding to the read out image L to the panel driving section 24. Consequently, the panel driving section 24 writes the image L into the liquid crystal panel 25 with the application voltage to the liquid crystal set to the inversed polarity.

After the writing of the image L ends, the control section 27 reads out, at step S7, the image R from the frame memory 23B$_R$ of the bank 23B and supplies a driving control signal corresponding to the read out image R to the panel driving section 24. Consequently, the panel driving section 24 writes the image R into the liquid crystal panel 25 with the application voltage to the liquid crystal set to the inversed polarity.

The processes at steps S4 to S7 described above are a line-sequential writing process of the image L for the left eye and the image R for the right eye into the liquid crystal panel 25 which is carried out twice within a period of one cycle of 24 Hz described hereinabove with reference to FIG. 9. Concurrently to the processes at steps S4 to S7, also the control process for the optical shutter 12 and the polarizing element 13 are carried out, and the process is hereinafter described with reference to FIG. 12.

At step S8, the control section 27 decides whether or not the projection should be ended. At step S8, for example, when no new image signal is supplied from the image signal inputting section 21 anymore or when an end button for ending the projection is operated on the operation section 22, the control section 27 decides that the projection should be ended. In this instance, the processing is ended.

On the other hand, if it is decided at step S8 that the projection should not be ended, then the processing returns to step S8 to execute the processes at steps S3 to S8 described above repetitively. It is to be noted, however, that, in the processes at steps S3 to S8 to be executed next, the bank from which an image signal is to be read out and the bank into which an image signal is to be written in the frame memory 23 are replaced with each other. In particular, in the subsequent processes at steps S3 to S9, writing of an image signal is carried out for the bank 23B while reading out of an image signal is carried out for the bank 23A. In the further subsequent processes at steps S3 to S8, writing of an image signal is carried out for the bank 23A while read out of an image signal is carried out for the bank 23B. Thereafter, such replacement is carried out repetitively, and when it is decided at step S8 that the projection should be ended, the processing is ended.

FIG. 12 illustrates a flow chart of an optical shutter and polarizing element controlling process by the liquid crystal projector 11. This process is carried out concurrently with the processes at steps S4 to S7 of FIG. 11 as described hereinabove.

Referring to FIG. 12, first at step S21, the control section 27 determines a region RA$_n$ (n=one of 1, 2, ..., N) of the optical shutter 12 corresponding to the position or pixel of the liquid crystal panel 25 for which writing is currently proceeding as a noticed region. Further, at step S21, also the region RB$_n$ of the polarizing element 13 is determined as a noticed region.

At step S22, the control section 27 supplies a control signal to the optical shutter 12 through the communication section 26 to control the shutters in the region RA$_n$ of the optical shutter 12.

At step S23, the control section 27 supplies a control signal to the polarizing element 13 through the communication section 26 to control the polarization direction for the region RB$_{n-1}$ of the polarizing element 13, which has formerly been a noticed region, to that for the left eye. In other words, the control section 27 controls the polarization direction in the region RB$_{n-1}$, with regard to which writing of an image has come to an end, to that for the left eye.

It is to be noted that, if the polarization direction in the last polarization control for the region RB$_{n-1}$ is controlled to that for the left eye, then at step S23, the control section 27 controls so that the polarization direction may become that for the right eye. On the contrary, if the polarization direction in the last polarization control for the region RB$_{n-1}$ is controlled to that for the right eye, then the control section 27 controls so that the polarization direction may become that for the left eye. Consequently, the polarization direction can be set in order to those corresponding to the image L, image R, image L and image R as seen in FIG. 9.

At step S24, the control section 27 supplies a control signal to the optical shutter 12 through the communication section 26 to control so that the shutters in the region RA$_{n-1}$ which is a noticed region in the preceding cycle in the optical shutter 12 and corresponds to the region RB$_{n-1}$ whose changeover of the polarization direction is completed are opened.

At step S25, the control section 27 decides whether or not it is necessary to change the noticed region, and waits until it is decided that it is necessary to change the noticed region. At step S25, if the image writing position of the liquid crystal panel 25 is displaced from the region RA$_n$ which currently is a noticed region, then the control section 27 decides that it is necessary to change the noticed region.

If it is decided at step S25 that it is necessary to change the noticed region, then the processing advances to step S26, at which the control section 27 decides whether or not all of the regions RA$_1$ to RA$_N$ of the optical shutter 12 have been set as a noticed region by four times. In particular, since, in the processes at steps S4 to S7 of FIG. 11, four images of the image L, image R, image L and image R are written, within a period of time corresponding to the processes at steps S4 to S7, each of the regions RA$_1$ to RA$_N$ of the optical shutter 12 is set as a noticed region by four times.

In other words, the period of time within which the processes at steps S21 to S26 of FIG. 12 are repeated by N times and all of the regions RA$_1$ to RA$_N$ of the optical shutter 12 are individually set once as a noticed region corresponds to the processing time for each one step at steps S4, S5, S6 and S7 of FIG. 11. Accordingly, if it is decided at step S26 that all of the regions RA$_1$ to RA$_N$ of the optical shutter 12 are individually set four times as a noticed region, since this is equivalent to that the processes at steps S4 to S7 of FIG. 11 end, the process of FIG. 12 is ended.

On the other hand, if it is decided at step S26 that all of the regions RA$_1$ to RA$_N$ of the optical shutter 12 are not individually set four times as a noticed region, then the processing returns to step S21 to repeat the processes at steps S21 to S26 described hereinabove. Thus, the regions RA$_{n+1}$ to RB$_{n+1}$ corresponding to the image writing position of the liquid crystal panel 25 are set as noticed regions, and the shutter opening/closing operation and the polarization direction are controlled.

As described above, in the 3D image projection system 10, since the shutter opening/closing operation in the regions RA$_1$ to RA$_N$ of the optical shutter 12 and the polarization direction in the regions RB$_1$ to RB$_N$ of the polarizing element 13 are controlled in synchronism with writing into the liquid crystal panel 25, the luminance of an image displayed on the screen 4 can be enhanced significantly.

Further, with the liquid crystal projector 11 of FIG. 5, where the liquid crystal panel 25 is driven in the order of the image L (normal), image R (normal), image L (inversed) and image R (inversed), a 3D image whose flickers are reduced significantly can be displayed while the condition necessary for a liquid crystal device that the integrated value of the DC component is zero is satisfied.

It is to be noted that, while, in the example described above, the liquid crystal panel 25 is driven repetitively in the order of the image L (normal), image R (normal), image L (inversed) and image R (inversed), the order of the normal polarity and the inversed polarity may be reversed. In particular, the liquid crystal panel 25 may be driven repetitively in the order of the image L (inversed), image R (inversed), image L (normal) and image R (normal).

Also the order of the image L and the image R may be reversed. In particular, the liquid crystal panel 25 may be driven repetitively in the order of the image R (normal), image L (normal), image R (inversed) and image L (inversed). Further, the liquid crystal panel 25 may be driven repetitively in the order of the image R (inversed), image L (inversed), image R (normal) and image L (normal).

In particular, where one and the other of image signals for the left eye and the right eye are represented as first and second image signals, respectively, and one and the other of the normal and inversed polarity states of the voltage to be applied to the liquid crystal panel 25 are represented as first and second states, respectively, the liquid crystal panel 25 is driven in the order of the first state based on the first image signal, the first state based on the second image signal, the second state based on the first image signal and the second state based on the second image signal.

While, in the embodiment described above, the liquid crystal panel 25 is an HD panel having the resolution of 2K×1K (horizontal direction×vertical direction), another panel (hereinafter referred to as 4K panel) having another resolution of 4K×2K (horizontal direction×vertical direction) as seen in FIG. 13 is described.

Where the liquid crystal panel 25 of the liquid crystal projector 11 is a 4K panel, the control section 27 divides the entire area of the liquid crystal panel 25 into four regions of the 2K×1K size and supplies a driving control signal to the panel driving section 24 such that the regions are scanned line-sequentially in an outward direction individually from the center of the screen of the liquid crystal panel 25 toward respective corresponding ones of the corners of the screen.

Where the line-sequential scanning is studied in regard to application to the regions $RA_1$ to $RA_N$ of the optical shutter 12, the liquid crystal panel 25 updates the image in the order of the regions $RA_{X-1}$ and $RA_{X+2}$, $RA_{X-2}$ and $RA_{X+3}$, ..., $RA_2$ and $RA_{N-1}$ and $RA_1$ and $RA_N$ from the regions $RA_X$ to $RA_{X+1}$ at the center of the screen in the vertical direction as seen in FIG. 14. Here, a line between the region $RA_X$ and the region $RA_{X+1}$ is the center line by which the liquid crystal panel 25 is divided into two portions in the vertical direction.

Thus, the control section 27 controls the optical shutter 12 and the polarizing element 13 such that the regions $RA_1$ to $RA_N$ are scrolled from the central portion in the vertical direction toward the top and the bottom ends. In other words, the control section 27 sets a noticed region in the order of the regions $RA_X$ and $RA_{X+1}$, $RA_{X-1}$ and $RA_{X+2}$, $RA_{X-2}$ and $RA_{X+3}$, ..., $RA_2$ and $RA_{N-1}$ and $RA_1$ and $RA_N$ in synchronism with the writing position of the liquid crystal panel 25. Accordingly, two regions of the optical shutter 12 are always determined as the noticed regions. However, where the number N is an odd number, only one noticed region is set first.

In FIG. 14, the regions $RA_2$ and $RA_{N-1}$ indicated by a shadow are set as the noticed regions. Meanwhile, the regions $RA_1$ and $RA_N$ indicated by slanting lines are set as noticed regions in the next cycle and are in a state wherein the shutters are open and the preceding control of the polarization direction for the right eye is maintained.

FIG. 15 is a view corresponding to the view of the driving control in related art illustrated in FIG. 3 and illustrates a relationship among the panel image and driving polarity of the liquid crystal panel, opening/closing operation of the optical shutter 12 and polarization direction of the polarizing element 13 where the liquid crystal panel 25 is a 4K panel.

Referring to FIG. 15, within a time $T_1$, the image $L_1$ is written into the liquid crystal panel 25 by an application voltage of the normal polarity. In this instance, in the regions $RA_X$ and $RA_{X+1}$ of the optical shutter 12 and the regions $RB_X$ and $RB_{X+1}$ of the polarizing element 13 which correspond to the central portion of the screen of the liquid crystal panel 25, the shutters are opened and the polarization direction is controlled to that for the left eye from an initial stage of the $T_1$ time at which writing into a region of the liquid crystal panel 25 corresponding to the regions $RA_X$, $RA_{X+1}$, $RB_X$ and $RB_{X+1}$ is completed.

The time at which the shutters of the region $RA_X$ and $RA_{X+1}$ of the optical shutter 12 are closed for the next time is the top of $T_2$ time after time of approximately one field at which the regions $RA_X$ and $RA_{X+1}$ are set to noticed regions subsequently. Then, within the $T_2$ time, when the shutters in the regions $RA_X$ and $RA_{X+1}$ of the optical shutter 12 are opened again, the polarization direction in the regions $RB_X$ and $RB_{X+1}$ of the polarizing element 13 is controlled to that for the right eye. The shutter opening in the regions $RA_X$ and $RA_{X+1}$ and the polarization control for the right eye in the regions $RB_X$ and $RB_{X+1}$ are maintained for a period of time of one field.

On the other hand, in the regions $RA_1$ and $RA_N$ of the optical shutter 12 and the regions $RB_1$ and $RB_N$ of the polarizing element 13 which correspond to the top and bottom of the screen of the liquid crystal panel 25, respectively, the shutters are opened and the polarization direction is controlled to that for the left eye immediately before the end of the $T_1$ time at which writing into a region of the liquid crystal panel 25 corresponding to the regions $RA_N$ to $RB_N$ ends.

The time at which the shutters in the regions $RA_1$ and $RA_N$ of the optical shutter 12 are closed for the next time is a point of time immediately before the end of the $T_2$ time after a period of time of one field at which the regions $RA_1$ and $RA_N$ are set to noticed regions subsequently. Then, when the shutters in the regions $RA_1$ and $RA_N$ of the optical shutter 12 are opened again within the $T_2$ time, the polarization direction in the regions $RB_1$ and $RB_N$ of the optical shutter 12 is controlled to that for the right eye. The shutter opening in the regions $RA_1$ and $RA_N$ and the polarization control for the right eye in the regions $RB_1$ and $RB_N$ are maintained for a period of time of approximately one field.

Also control of the shutters and the polarization direction within $T_3$ time and $T_4$ time is carried out similarly.

Accordingly, also where the liquid crystal panel 25 is a 4K panel, by controlling the shutter opening/closing operation of the regions $RA_1$ to $RA_N$ of the optical shutter 12 and the polarization direction in the regions RB1 to RBN of the polarizing element 13 in a synchronized relationship with the writing position of the liquid crystal panel 25, the period of time within which the shutters are closed can be made a very short period of time within which each of the regions of the optical shutter 12 and the polarizing element 13 is set as a noticed region. Accordingly, the luminance of the projected image can be enhanced significantly when compared with that of the system in related art.

Further, also where the liquid crystal panel 25 is a 4K panel, since the liquid crystal panel 25 is driven in the order of the image L (normal), image R (normal), image L (inversed) and image R (inversed) similarly, a 3D image whose flickers are reduced significantly can be displayed while the condition necessary for a liquid crystal device that the integrated value of the DC component is zero is satisfied.

While, in the embodiment described above, it is changed over based on an operation signal from the operation section 22 whether a 3D image should be displayed or projected or a 2D image should be displayed or projected. However, for example, where an image signal includes information representative of whether the image to be displayed based on the image signal is a 2D image or a 3D image, the control may be changed over based on the information.

Further, while, in the embodiment described hereinabove, a 3D image is projected based on an image signal inputted to the image signal inputting section 21, the liquid crystal projector 11 can naturally project a 3D image read out from the removable medium 29 or the like. Further, the optical shutter 12 or the polarizing element 13 may be built in the liquid crystal projector 11.

It is to be noted that, in the present specification, the steps illustrated in the flow charts may be but is not necessarily processed in a time series in the order as described, and include processes which are executed in parallel or individually without being processed in a time series.

Further, in the present specification, the term "system" is used to represent an entire apparatus composed of a plurality of apparatus.

While a preferred embodiment of the present invention has been described using specific terms, such description is merely for illustrative purpose, and it is to be understood that changes and variations may be made without departing from the spirit or scope of the following claims.

What is claimed is:

1. A liquid crystal projector which projects a three-dimensional image based on an image signal for a left eye and an image signal for a right eye, comprising:
    a liquid crystal panel that independently displays an image for the left eye and an image for the right eye in a one-field time period based on the image signal for the left eye and the image signal for the right eye by line-sequentially scanning a screen;
    an optical shutter having a plurality of horizontally elongated first divisional regions arranged above each other in a vertical direction, the plurality of first divisional regions each being independently controllable from each other in regard to whether or not light should be blocked;
    a polarizing element having a plurality of horizontally elongated second divisional regions arranged above each other in the vertical direction, the second divisional regions each being independently controllable from each other in regard to whether the polarization direction corresponds to the left eye or the right eye; and
    a control circuit that controls the first divisional regions and the second divisional regions in synchronism with the line-sequential scanning by said liquid crystal panel.

2. The liquid crystal projector according to claim 1, wherein
    said liquid crystal panel line-sequentially scans the screen from the upper left corner to the lower right corner of the screen to display a predetermined image on said liquid crystal panel, and
    said control circuit controls the first divisional regions and the second divisional regions in an order in which the first and second divisional regions are juxtaposed in the vertical direction.

3. The liquid crystal projector according to claim 1, wherein
    the screen of said liquid crystal panel includes a screen having four equal divided regions and line-sequentially scans the four equal divided regions from a center of the screen toward four corners of the screen to display a predetermined image concurrently in the four equal divided regions of said liquid crystal panel, and
    said control circuit controls the first divisional regions and the second divisional regions in an order in which the four equal divided regions are juxtaposed in an upward direction and a downward direction from a central portion of the screen.

4. The liquid crystal projector according to claim 1, wherein
    said liquid crystal panel receives alternating voltages of normal and inversed polarities, the image signal for the left eye being represented as a first image signal and the image signal for the right eye being represented as a second image signal, the voltage of normal polarity being represented as a first state and the voltage of inverse polarity being represented as a second state, and
    said liquid crystal projector further comprises:
    a driving circuit that drives said liquid crystal panel in an order of the first state based on the first image signal, the first state based on the second image signal, the second state based on the first image signal and the second state based on the second image signal.

5. A control method for a liquid crystal projector which projects a three-dimensional image, comprising:
    displaying, at a liquid crystal panel, an image for the left eye and an image for the right eye in a one-field time period by line-sequentially scanning a screen;
    controlling, at an optical shutter having a plurality of horizontally elongated first divisional regions arranged above each other in a vertical direction, each first divisional regions independent of each other in regard to whether or not light should be blocked;
    controlling, at a polarizing element having a plurality of horizontally elongated second divisional regions arranged above each other in the vertical direction, each second divisional regions independent of each other in regard to whether the polarization corresponds to the left eye or the right eye
    controlling, at a control circuit, the first divisional regions and the second divisional regions in synchronism with the line-sequential scanning by the liquid crystal panel.

6. The liquid crystal projector according to claim 2, wherein in response to the scan being performed for a first image signal, the control circuit opens each shutter of the plurality of first divisional regions and sets the polarization direction of the plurality of second divisional regions to the direction of an eye designated by the first image signal.

7. The liquid crystal projector according to claim 6, wherein in response to the scanning of an image signal after the first image signal, the control circuit designates a noticed divisional region from one of the first divisional regions, the noticed divisional region corresponding to the display position.

8. The liquid crystal projector according to claim 7, wherein the control circuit closes a shutter in the noticed divisional region while the display position is being scanned by the liquid crystal panel.

9. The liquid crystal projector according to claim 7, wherein the control circuit designates a next noticed divisional region from one of the first divisional regions in response to scanning advancing the display position to an end of the noticed divisional region, the next noticed divisional region succeeding the noticed divisional region in a downward vertical direction.

10. The liquid crystal projector according to claim 7, wherein the control circuit opens a shutter in a first divisional region preceding the noticed divisional region in an upward vertical direction.

11. The liquid crystal projector according to claim 7, wherein the control circuit sets a polarization direction of a second divisional region preceding the noticed divisional region in an upward vertical direction to an eye designated by the image signal being scanned.

12. The liquid crystal projector according to claim 7, wherein the control circuit opens a shutter in a first divisional region preceding the noticed divisional region in an upward vertical direction and sets a polarization direction of a second divisional region preceding the noticed divisional region in an upward vertical direction to an eye designated by the image signal being scanned.

13. The liquid crystal projector according to claim 9, wherein the next noticed divisional region corresponds to an uppermost first divisional region in response to scanning advancing the display position to an end of a noticed divisional region corresponding to a lowest first divisional region in a downward vertical direction.

14. The liquid crystal projector according to claim 7, wherein a number of times a first divisional region is designated as the noticed divisional region corresponds to the number of images being scanned by the liquid crystal panel.

15. The liquid crystal projector according to claim 6, wherein when the scanning of the image signal is being performed after a first time, the control circuit designates a first noticed divisional region and a second noticed divisional region from the plurality of the first divisional regions, the first and second noticed divisional regions corresponding to the display position.

16. The liquid crystal projector according to claim 15, wherein the control circuit closes a shutter in the first noticed divisional region and second noticed divisional region while the display position is being scanned by the liquid crystal panel.

17. The liquid crystal projector according to claim 15, wherein the control circuit designates a next first noticed divisional region and a next second noticed divisional region from the plurality of the first divisional regions in response to scanning advancing the display position to an end of the first noticed divisional region and the second noticed divisional region, the next first noticed divisional region succeeding the first noticed divisional region in an upward vertical direction and the next second noticed divisional region succeeding the second noticed divisional region in a downward direction.

18. The liquid crystal projector according to claim 15, wherein the control circuit
    opens a shutter in a first divisional region preceding the first noticed divisional region in an downward vertical direction and set a polarization direction of a second divisional region preceding the first noticed divisional region in an downward vertical direction to an eye designated by the image signal being scanned, and
    opens a shutter in a first divisional region preceding the second noticed divisional region in an upward vertical direction and set a polarization direction of a divisional region preceding the second noticed divisional region in an upward vertical direction to an eye designated by the image signal being scanned.

\* \* \* \* \*